United States Patent
Chehimi et al.

(10) Patent No.: US 8,053,567 B2
(45) Date of Patent: Nov. 8, 2011

(54) MODIFIED SURFACE MATERIAL, METHOD FOR PREPARING SAME AND USES THEREOF

(75) Inventors: Mohamed Mehdi Chehimi, Paris (FR); Jean Pinson, Fontenay-Sous-Bois (FR); Bernadette Charleux, Vincennes (FR); Christophe Bureau, Juvisy-sur-Orge (FR); Christopher Tronche, Versailles (FR); Tarik Matrab, Cergy (FR); Christian Perruchot, Houilles (FR); Eva Cabet-Deliry, Paris (FR); Maud Save, Issy-les-Moulineaux (FR)

(73) Assignees: Universite Paris 7—Denis Diderot, Paris (FR); Alchimedics, Massy (FR)

( * ) Notice: Subject to any disclaimer, the term of this patent is extended or adjusted under 35 U.S.C. 154(b) by 1286 days.

(21) Appl. No.: 11/628,205

(22) PCT Filed: Jun. 2, 2005

(86) PCT No.: PCT/FR2005/001355
§ 371 (c)(1),
(2), (4) Date: Mar. 1, 2007

(87) PCT Pub. No.: WO2006/000692
PCT Pub. Date: Jan. 5, 2006

(65) Prior Publication Data
US 2008/0064783 A1    Mar. 13, 2008

(30) Foreign Application Priority Data
Jun. 2, 2004   (FR) ..................... 04 05937

(51) Int. Cl.
*C08F 2/50*       (2006.01)
*C07C 245/06*     (2006.01)
*C07C 245/00*     (2006.01)

(52) U.S. Cl. ............ 534/560; 534/558; 522/31; 522/32; 522/63; 522/65; 522/67

(58) Field of Classification Search .................. 534/560, 534/558; 522/31, 32, 63, 65, 67
See application file for complete search history.

(56) References Cited

U.S. PATENT DOCUMENTS
6,435,240 B1    8/2002   Fagebaume et al.
2004/0248428 A1  12/2004  Bureau et al.

FOREIGN PATENT DOCUMENTS
EP   1431821   6/2004
EP   1459810   9/2004
FR   2672307   8/1992

OTHER PUBLICATIONS

J. Pinson et al. Attachment of organic layers to conductive or semiconductive surfaces by reduction of diazonium salts. Chemical Society Reviews, 2005, 34, 429-439.*
Lui et al. Reactions of Organic Monolayers on Carbon Surfaces Observed with Unenhances Raman Spectroscopy. Journal of Americal Chemical Society, 1995, 117 (45), pp. 11254-11259.*
Allongue et al. Covalent Modification of Carbon Surfaces by Aryl Radicals Generated from Electrochemical Reduction of Diazonium Salts. Journal of Americal Chemical Society, 1997, 119(1), pp. 201-207.*
Matrab et al. Novel Approch to Metallic Surface-Initiated Atom Transfer Polymerization Using Electrografted Initiators Based on Aryl Diazonium Salts. Langmuir (2005), 21 (10), 4686-4694.*

* cited by examiner

*Primary Examiner* — Sanza McClendon
(74) *Attorney, Agent, or Firm* — Young & Thompson

(57) ABSTRACT

The use of at least one diazonium salt bearing an initiator function, for forming an undercoat obtained by grafting a graft derived from the diazonium salt and bearing an initiator function at the surface of a conductive or semiconductive material on the undercoat, and for forming on the undercoat a polymeric layer obtained by polymerization, in particular free radical polymerization, in situ of at least one monomer, initiated from the initiator function.

1 Claim, 9 Drawing Sheets

FIGURE 8A
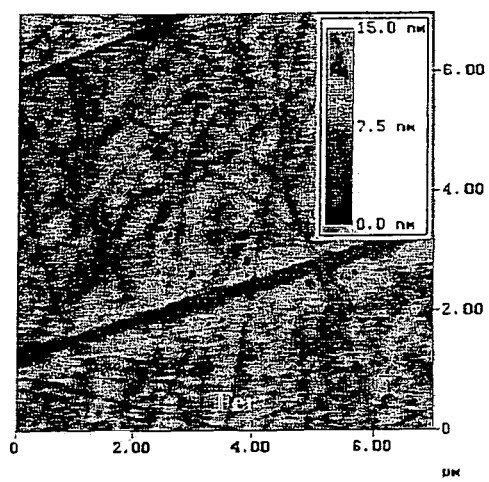
FIGURE 8B
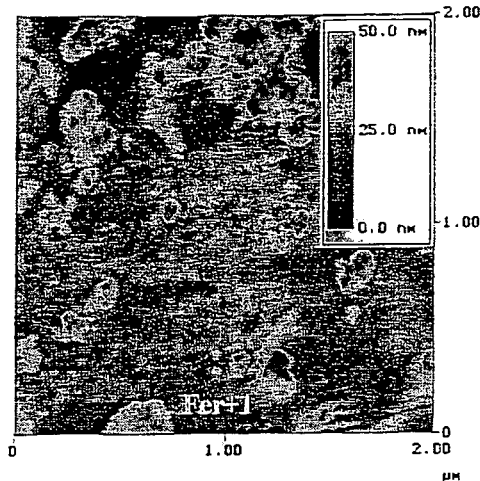
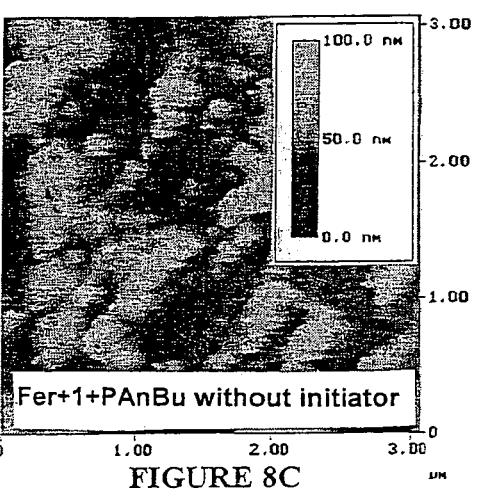
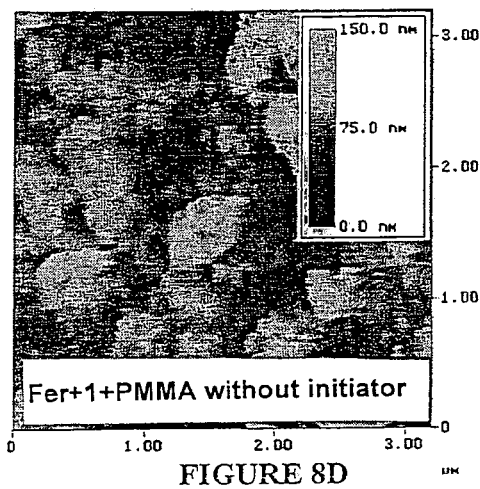
FIGURE 8C
FIGURE 8D
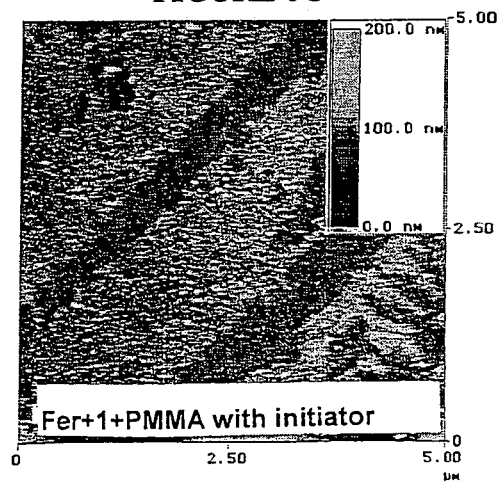
FIGURE 8E

MODIFIED SURFACE MATERIAL, METHOD FOR PREPARING SAME AND USES THEREOF

BACKGROUND OF THE INVENTION

1. Field of the Invention

A subject of the present invention is a material, in particular metallic, the surface of which is modified, as well as its preparation method. The present invention also relates to the uses of said material, in particular for the preparation of implants, stents or prostheses.

2. Description of the Related Art

The covering of metallic surfaces by organic layers constitutes a set of significant industrial methods (Plankaert, 1994; Biethan et al., 1991; Hochberg, 1979). These methods involve the deposition of a polymer on a metal sheet, either from a liquid, or from a solid polymer sheet or also by cataphoresis. In these methods, only weak bonds are formed between the metal and the organic layer. Other methods have been described, they also involve weak bonds for example during the deposition of polyphenols on Pt (McCarley, 1990), in the electrochemical deposition of conductive polymers in particular on iron (Lu et al., 1988; Cheung et al., 1988; Troch-Nagels et al., 1992; Schirmeisen et al., 1989; Beck et al., 1994; Otero et al., 1992; Ferreira et al., 1990; Ferreira et al., 1996; Krstajić et al., 1997; Su et al., 1997; Fraoua et al., 1999).

Two types of methods exist for creating stronger bonds between the metal and the organic layer: in the first type a bond is formed between the organic layer and an oxide on the surface of the metal (Biethan, 1991; Hochberg, 1979; Boenig, 1984; d'Agostino, 2000; Vautrin-Ul et al., 2000), and in the second type, bonds are formed between the metal itself and the organic layer.

Several electrochemical methods already exist which make it possible to attach polymers to metallic surfaces using covalent bonds. Polymer layers can be attached to platinum by oxidation of N-vinylpyrrolidone (Doneux et al., 1997; Calberg et al., 1998). Moreover, the electrochemical oxidation of amines leads to the grafting of —NHR units onto the platinum. By using ω-diamines such as ethylenediamine, it is possible to attach polyethyleneimine to Au, Pt or Al (Herlem et al., 1997; Herlem et al., 2000; Fahys et al., 2002; Herlem et al., 2003; Lakard et al., 2002). However, it should be noted that the methods using the electrochemical oxidation of organic substrates are not applicable to industrial metals which are in general very easy to oxidize. Methods using electrochemical reduction are therefore particularly desirable. One of these methods (Lécayon et al., 1982; Deniau et al., 1992; Viel et al., 1993; Bureau et al., 1994; Tanguy et al., 1993; Tanguy et al., 1994; Tanguy et al., 1996; Deniau et al., 1997; Bureau et al., 1997; Deniau et al., 1998; Charlier et al., 1999; Viel et al., 1999; Jérome et al., 2001; Baute et al., 1999; Mertens et al., 1998; Calberg et al., 1997) involves reducing an active acrylic monomer onto a metallic surface (for example of nickel or iron). The radical-anion formed under anhydrous conditions is responsible for the reaction with the metal and for the continuation of polymerization. A fine layer of polymer (2 to 10 nm) is attached in a covalent manner onto the surface. At the same time, a thicker layer of polymer is only deposited, it can be eliminated by rinsing.

Several methods for grafting preformed polymers onto a functionalized surface ("grafting onto") have already been described making it possible to attach polymers to a polyaryl under-layer obtained by the electrochemical reduction of diazonium salts. The first method consists of grafting onto the metal a benzophenone unit which reacts with the polystyrene under photochemical irradiation; the second method consists of grafting a benzoic acid unit, which can react with magnesium ions and the free carboxylic groups of a polyester deposited mechanically onto the surface (Adenier et al., 2002). A method which is similar to the first two has also been described (Lou et al., 2002), involving grafting polyesters comprising pendant acrylate groups by electrochemistry. The poly-ε-caprolactone thus grafted being miscible with poly (vinyl chloride), the PVC layers thus obtained are strongly adherent.

Several "grafting-from" type methods have been developed which make it possible to make polymers grow from a functionalized surface. On an iron surface, it is possible to carry out the electrochemical grafting of a polyacrylate with a low molar mass the acrylate unit of which contains a chemical function allowing the subsequent polymerization of another monomer. For example, ethyl 2-chloropropionate acrylate allows the initiation of polymerization of the styrene by Atom Transfer Radical Polymerization (ATRP) (Claes et al., 2003), norbornenylmethylene acrylate offers the possibility of polymerizing norbornene by ring opening metathesis polymerization (ROMP) (Detrembleur et al., 2001) and 2-phenyl-2-(2,2,6,6-tetramethyl-piperidin-1-yloxy)-ethylacrylate (PTEA) makes the polymerization of styrene possible, thanks to the presence of alkoxyamine (polymerization initiator) according to the nitroxide mediated process (NMP) (Voccia et al., 2003).

SUMMARY OF THE INVENTION

The purpose of the present invention is to provide a novel "grafting from" method of grafting allowing grafting of the polymers onto a surface comprising conductive or semi-conductive zones, in particular metallic, by prior grafting of an under-layer obtained by the reduction of a diazonium salt.

The purpose of the present invention is in particular to provide materials comprising conductive or semi-conductive zones, covered with a layer of polymers of sufficient thickness and/or appropriate structure to resist corrosion, for example in biological media, and wear, for example by friction.

One of the purposes of the present invention is to provide materials, in particular biologically compatible, comprising conductive or semi-conductive zones covered with a polymer allowing their use within the framework of prostheses, stents or implants.

Another purpose of the present invention is to provide a method for the modification of the surface of a conductive or semi-conductive zone of a material making it possible to graft any polymer onto said material.

Another purpose of the present invention is to provide a method for the modification of the surface of a conductive or semi-conductive zone which is industrially applicable and unaffected by water.

Another purpose of the present invention is to provide a method for the modification of the surface of a conductive or semi-conductive zone, whatever its form.

The present invention relates to the use of at least one diazonium salt carrying a polymerization-initiation function, on the one hand for the formation of an under-layer obtained by grafting of a graft derived from said diazonium salt and carrying a polymerization-initiation function on the surface of a conductive or semi-conductive material and on the other hand for the formation on said under-layer of a polymeric layer obtained by non-anionic in situ polymerization of at least one monomer, initiated from said polymerization initiator function.

The present invention relates to the use as defined above, characterized in that the polymeric layer is obtained by radical polymerization or by ring opening polymerization.

Among the radical polymerization methods, there can be mentioned: atom transfer radical polymerization methods (ATRP), nitroxide mediated polymerization (NMP) and photopolymerization.

The present invention relates to the use as defined above, characterized in that the polymeric layer is obtained by one of the following polymerization methods: ring opening polymerization (ROP), photopolymerization, atom transfer polymerization and nitroxide-polymerization.

The graft derived from said diazonium salt and carrying a polymerization initiator function is hereafter designated polymerization initiator graft, and this graft corresponds to an entity grafted onto the surface of the material and therefore bonded to said surface.

The expression "polymerization initiator graft" designates a chemical compound capable of forming the first species of a polymerization chain reaction.

The graft derived from said diazonium salt and carrying a polymerization initiator function, also called a polymerization initiator graft, is characterized in that it contains a carbon skeleton and a polymerization initiator function. During the abovementioned radical polymerization reaction, in particular ATRP or NMP, said initiator graft, carrying a polymerization initiator function, grafted onto the surface, undergoes a reductive cleavage which leads to the carbon skeleton of the initiator being left on the surface of the material, whereas the polymerization initiator function is found at the end of the polymer chain forming the abovementioned polymeric layer.

The expression "conductive or semi-conductive material" designates either a conductive material possessing no forbidden band or a semi-conductive material the forbidden band of which is of electron-volt order.

The expression "in situ polymerization" designates a polymerization reaction carried out in the presence of the conductive or semi-conductive surface, either untreated or modified by the method of the invention ("grafting from" method). This polymerization reaction is the opposite of the case where the surface is grafted with an already formed polymer ("grafting onto").

The preferred polymerization methods are the methods of atom transfer radical polymerization (ATRP) (Claes et al., 2003), nitroxide mediated polymerization (NMP) (Voccia et al., 2003), ring opening polymerization (ROP) (Edmondson et al., 2004; Husseman et al., 1999), as well as the methods of reversible addition-fragmentation transfer chain polymerization (RAFT) (Edmondson et al., 2004; Baum et al., 2002) and of ring opening metathesis polymerization (ROMP) (Detrembleur et al., 2001).

The present invention also relates to a conductive or semi-conductive zone of interest of a material, the surface of said zone being modified, and comprising the following layers:
  an under-layer constituted by initiator grafts derived from a diazonium salt and bonded to said surface, all of the bonds intervening between said under-layer and the surface of said conductive or semi-conductive zone of interest being covalent bonds,
  said under-layer being characterized in that:
    it has a thickness of approximately 1 nm to approximately 1 μm, and preferably of approximately 3 nm to approximately 100 nm,
    the grafts directly bonded to the surface of said conductive or semi-conductive zone of interest are bonded in particular by an atom bond of the graft-atom of the zone, in particular by a covalent carbon bond of the graft-atoms of said zone,
  a polymeric layer situated on the abovementioned under-layer, constituted by a polymer resulting from the in situ non-anionic polymerization of at least one monomer in the presence of the initiator as defined above,
  said polymeric layer having a thickness of approximately 0.1 μm to approximately 100 μm,
  the polymeric layer covering from approximately 80% to approximately 100% of the surface of said conductive or semi-conductive zone of interest, in particular from approximately 95% to approximately 100% of said zone.

The present invention also relates to a conductive or semi-conductive zone of interest of a material, the surface of said zone being modified, characterized in that the polymeric layer as defined above is constituted by a polymer resulting from radical polymerization or ring opening polymerization.

Among the radical polymerization methods, there can be mentioned: atom transfer radical polymerization (ATRP), nitroxide mediated polymerization (NMP) and photopolymerization methods.

The present invention also relates to a conductive or semi-conductive zone of interest of a material, the surface of said zone being modified, as defined above, characterized in that the polymeric layer as defined above is constituted by a polymer resulting from a non anionic polymerization chosen from the following polymerization methods: ring opening polymerization (ROP), photopolymerization, atom transfer polymerization and nitroxide mediated polymerization.

The expression "conductive or semi-conductive zone of interest of a material" designates the parts of a material composed of a conductor or semi-conductor to which a treatment such as those described in the present invention is to be applied.

On a material composite comprising conductive or semi-conductive zones, only certain of these zones can be functionalized and thus constitute the zones of interest. Thus, by electrochemical route, these are the electrically connected zones on which the electrografting occurs, and, by chemical route, these are the zones brought into contact with the solutions, the other zones being optionally masked if necessary.

The expression "initiator grafts derived from a diazonium salt" advantageously designates either an aromatic group or a polyaryl-type chain forming on the one hand a bond with the surface and possessing on the other hand a chemical function capable of initiating the polymerization.

The polymerization initiators used within the framework of the present invention can be molecules carrying for example one or more halogen atoms, said halogen atom corresponding to the polymerization initiator function.

Thus, as mentioned previously, during the abovementioned polymerization reaction, said halogen is located at the end of the polymer chain forming the above-mentioned polymeric layer.

The present invention therefore involves a diazonium salt carrying a function allowing initiation of the polymerization. According to a particular embodiment of the present invention, the abovementioned under-layer is formed from successive graftings of several diazonium salts, for example in the form AAA-BBB, where A is an aryl group originating from a diazonium salt $AN_2^+$ and B is an aryl group originating from a diazonium salt $BN_2^+$.

The expression "atom bond of the graft-atom of the zone" designates the chemical bond, whatever its type, which binds an atom of the graft to an atom of the zone and which thus ensures that the graft is strongly bonded to the surface.

The expression "covalent carbon bond of the graft-atom of the zone" designates a particular bond such as a bond obtained by the combining of two electrons between an atom of the graft and an atom of the zone.

A particularly advantageous under-layer according to the invention is a polyaryl-type under-layer.

According to an advantageous embodiment, the under-layer as defined above of the conductive or semi-conductive zone of the invention is characterized in that the grafting area of the grafts on the surface of said zone is at a rate of at least 90%, in particular of at least 99% in relation to the surface of said conductive or semi-conductive zone of interest, the total surface of the defects being less than 10%, in particular less than 5%, of the area of the conductive or semi-conductive zones.

By "defect" is meant parts of the under-layer which would not have been modified by the treatment according to the invention and therefore where the material would appear without being modified.

This can be observed for example by near-field microscopy, and in particular by atomic force microscopy (AFM) (Adenier et al., 2002; Bernard et al., 2003).

The under-layer can also be characterized by its roughness.

The under-layer is such that the atoms which are bonded to the conductive or semi-conductive zone strongly bonded and resistant to prolonged and repeated rinsing operations in an ultrasonic bath in different solvents.

According to an advantageous embodiment, the under-layer as defined above of the conductive or semi-conductive zone of the invention is compact, as can be observed on the µm scale on AFM images (Adenier et al., 2002; Bernard et al., 2003).

In order to fix ideas on compactness, the under-layer as defined above of the conductive or semi-conductive zone of the invention is characterized in that the concentration of the grafts directly bonded to the surface of said zone is at the most approximately $20 \times 10^{-10}$ mole of graft per cm$^2$, which corresponds to the maximum surface concentration accessible to groups, in particular aryl, perpendicular to the surface, and preferably of approximately $1 \times 10^{-10}$ to $18 \times 10^{-10}$ mole of graft per cm$^2$ of surface of said zone.

These surface concentrations can be measured by forming a monolayer on the surface of the zone of interest, by ensuring that the under-layer formed is a monolayer by AFM and by carrying out a voltammogram of the grafts of the monolayer, then by integrating this voltammogram (Allongue et al., 1997).

According to an advantageous embodiment, the polymeric layer as defined above is characterized in that it is in particular free of residual monomer, non-grafted polymer and solvent. Thus, after the polymerization stage, the plates of material are carefully rinsed ultrasonically in dichloromethane. It can then be verified that the rinsing cycle is sufficient to eliminate the polymer residues adsorbed on the surface of the material. A plate of material brought into contact with a solution of PMMA-toluene is heated for 4 hours at 90° C. in the absence of initiator and copper chloride. Then, after four 5-minute ultrasonic washings in dichloromethane, analysis of the plate by IRRAS reveals no polymer signal. At this moment, PMMA (polymethylmethacrylate) remains in the rinsing solvent (IR analysis) but the polymer has completely disappeared from the dichloromethane after a fifth washing. As this rinsing cycle was applied to the plates immersed in the polymerization solutions containing CuCl and the initiator, the signals characteristic of PMMA and PAnBu according to IRRAS and XPS can be attributed to grafted and non-adsorbed polymer. This test therefore makes it possible to verify that the polymer which is not grafted is eliminated from the surface of the material.

By "residual monomer" is meant the monomer involved in the in situ polymerization, and by "non-grafted polymer" is meant any polymer formed from the monomer which is not bonded to the under-layer.

By "solvent", is meant in particular the in situ polymerization solvent. The polymeric layer advantageously possesses the property of remaining on the under-layer even when it is brought into contact with a solvent in which the in situ polymerization has been carried out or in which the polymer is soluble.

One parameter for characterizing the polymeric layer is roughness.

The average roughness represents the arithmetic mean of the deviations with respect to the mid-plane $$R = \frac{\sum_{j=1}^{N} |Z_i - Z_{ep}|}{N}$$

$Z_{cp}$ is the value of Z for the mid-plane, $Z_i$ the current value of Z, and N the number of points in a given field. R must therefore be equal to zero for a perfectly flat surface.

The present invention also relates to a conductive or semi-conductive zone of interest of a material as defined above, characterized in that the under-layer has a purity level of approximately at least 80%, and in particular of approximately 90% to approximately 100%, verified by XPS or infrared analyses, and is in particular free of solvent, diazonium salt and its derivatives.

By "solvent" is meant in particular that which has been used to carry out the formation of the under-layer. This can be verified by an infrared test or an XPS test.

By "diazonium salt derivatives", is meant in particular $ArN_2^+$, ArOH or ArH.

The absence of the signal of the solvent can be verified by infrared, for example according to the nature of the solvent, by the absence of the nitrile band of acetonitrile at 2254 cm$^{-1}$ or of the carbonyl band of dimethylformamide at 1675 cm$^{-1}$.

The absence of electrolyte can be verified by the absence of chlorine (in the case where the electrolyte is a perchlorate) which appears around 1095 cm$^{-1}$ and around 208 eV (Cl2p) or by the absence of fluorine (in the case where the electrolyte is a tetrafluoroborate) which appears around 1050 and 1075 cm$^{-1}$ and around 687 eV (F1s), by IR (cm$^{-1}$) and XPS (eV) analyses respectively. The absence of residual diazonium salt ($ArN_2^+$) can be verified by the absence of the band characteristic of the diazonium salts around 2300 cm$^{-1}$ according to IR.

Concerning the absence of the diazonium hydrolysis product (ArOH), the corresponding phenol can be observed by the absence according to IR of the OH band around 3300-3500 cm$^{-1}$.

The absence of the diazonium reduction product (ArH) can be verified in the rinsing solvents by gas chromatography (GC) or in liquid chromatography (HPLC) by comparison with an authentic sample.

Moreover, the under-layer is free of electrolytes capable of being involved in the process for grafting initiator grafts derived from a diazonium salt, which are originally carried in particular by diazonium salts. The same applies to the counter-ion of the diazonium salt, for example the tetrafluoroborate ion. The absence of electrolyte can be verified as described above.

One of the benefits of the modified conductive or semi-conductive zones of the invention is that there can be no monomer in the under-layer, which would result from the use, as polymerization initiator, of a monomer carrying, on the one hand, an acrylate function and, on the other hand, a function capable of initiating the polymerization of vinyl compounds. In particular, in the under-layer of the conductive or semi-conductive zones of the invention, there is no vinyl monomer because the under-layer is not made with a vinyl polymer base.

A conductive or semi-conductive zone of interest of an advantageous material, modified by the method according to the invention, is characterized in that the bonds involved in the grafts of the under-layer and forming a continuous sequence of covalent bonds of the surface of said material up to the polymeric layer are non-hydrolyzable bonds.

The bonds involved between the surface and the grafts of the under-layer are non-hydrolyzable.

The expression "bonds involved in the grafts of the under-layer" designates the chemical bonds comprised between the atom of the surface where the graft is attached and the first atom of the polymeric layer.

The expression "non-hydrolyzable bonds" designates bonds which cannot be cut by contact of the material with an aqueous or partially aqueous solution or more generally by reaction with a solvent with acid or basic properties, and in particular the non-hydrolyzable bonds of pH 0 to pH 14, preferably pH 1 to pH 13. However, the possibility of the presence of hydrolyzable (lateral) pendant groups, such as PMMA esters, should not be excluded.

According to an advantageous embodiment, the present invention relates to a conductive or semi-conductive zone of interest of a material, characterized in that the bonds involved in the grafts of the under-layer forming a continuous sequence of covalent bonds of the surface of said material up to the end of the polymeric layer are non-hydrolyzable bonds.

The expression "covalent bonds of the surface of said material up to the end of the polymeric layer" designates the covalent chemical bonds comprised between the atom of the surface where the graft is attached and the last atom of the polymeric layer.

The expression "continuous sequence of covalent bonds" corresponds to the situation according to which, by following the shortest path between the atom of the surface and the last atom of the polymeric layer, all the bonds linking the atoms situated on this path are covalent.

A conductive or semi-conductive zone of interest of a preferred material, as modified according to the method of the invention, comprises a polymer chain of the polymeric layer by atom bond of the graft-atom of the conductive or semi-conductive zone of interest, in particular by covalent carbon bond of the graft-atoms of the zone.

A conductive or semi-conductive zone of interest of a preferred material, as modified according to the method of the invention, is characterized in that the polymer chains, obtained in particular by ATRP, ROP or NMP, have a molecular mass substantially identical to one other and in that said chains are linked substantially perpendicularly to the surface of said material, thus forming dense brushes.

The expression "chains linked substantially perpendicularly to the surface of said material" designates polymer chains the average orientation of which is close to the local vertical of the surface as opposed to chains the orientation of which would be close to the surface itself.

The expression "dense brushes" designates all of the polymer chains linked to the surface in such a manner that their orientation is substantially perpendicular to the surface, their lengths substantially equal and the distance between these chains clearly less than their length (Edmondson et al., 2004).

More particularly, the total thickness of the polymeric layer grows in thickness, whilst retaining a constant roughness, which demonstrated well that all the polymer chains are of approximately the same length.

According to an advantageous embodiment, the conductive or semi-conductive zone of interest of a material as modified according to the method of the invention, is characterized in that the under-layer has an approximately uniform thickness and in that the grafts constituting said under-layer are bonded substantially perpendicularly to the surface of said material.

The expression "layer of approximately uniform thickness" designates a layer the thickness of which is of the same order of magnitude throughout the surface of the zone.

The present invention also relates to a conductive or semi-conductive zone of interest of a material as defined above, modified according to the method of the invention, characterized in that the grafts are aromatic compounds, in particular aryl groups, in which the aromatic group is a $C_6$-$C_{20}$ aromatic radical, substituted by one or more functional substituents, in particular a halogen atom, such as a bromine atom, or a heteroaromatic radical with 4 to 20 atoms, substituted by one or more functional substituents, comprising one or more heteroatoms chosen from oxygen, nitrogen, sulphur or phosphorus.

According to an advantageous embodiment, there is no aliphatic-type bond between the atoms of the zone and the atom of the graft directly bonded to the zone. In other words, advantageously, the atoms of the graft directly bonded to the atoms of the zone are involved, in the graft, in aromatic bonds.

The present invention also relates to a conductive or semi-conductive zone of interest of a material as defined above, modified according to the method of the invention, in which the aromatic group comprises one or more substituents chosen from the group constituted by:

the aliphatic, linear or branched radicals with 1 to 20 carbon atoms, comprising optionally one or more double or triple bond(s), optionally substituted by carboxyl radicals, $NO_2$, OH, disubstituted protected amino, monosubstituted protected amino, cyano, diazonium, alkoxy with 1 to 20 carbon atoms, alkoxycarbonyl with 1 to 20 carbon atoms, alkylcarbonyloxy with 1 to 20 carbon atoms, optionally fluorinated vinyl or allyl, halogen atoms, ammonium groups comprising 1 to 20 carbon atoms, acid anhydrides comprising 1 to 20 carbon atoms, urea or thiourea derivatives comprising 1 to 20 carbon atoms, oxime functions and phosphonic acids, the aryl radicals optionally substituted by carboxyl radicals, $NO_2$, OH, disubstituted protected amino, monosubstituted protected amino, cyano, diazonium, alkoxy with 1 to 20 carbon atoms, alkoxycarbonyl with 1 to 20 carbon atoms, alkylcarbonyloxy with 1 to 20 carbon atoms, optionally fluorinated vinyl or allyl, halogen atoms, ammonium groups comprising 1 to 20 carbon atoms, acid anhydrides comprising 1 to 20 carbon atoms, urea or thiourea derivatives comprising 1 to 20 carbon atoms, oxime functions and phosphonic acids, the carboxyl radicals, $NO_2$, OH, disubstituted protected amino, monosubstituted protected amino, cyano, diazonium, alkoxy with 1 to 20 carbon atoms, alkoxycarbonyl with 1 to 20 carbon atoms, alkylcarbonyloxy with 1 to 20 carbon atoms, optionally fluorinated vinyl, halogen atoms, ammonium groups comprising 1 to 20 carbon atoms, acid anhydrides comprising 1 to 20 carbon atoms, urea or thiourea derivatives comprising 1 to 20 carbon atoms, oxime functions and phosphonic acids.

A conductive or semi-conductive zone of interest of an advantageous material as modified according to the invention is characterized in that the under-layer is presented in the form of grafts, each composed of a single aryl group, which corresponds to a monolayer.

The expression "monolayer of grafts" designates an under-layer the grafts of which comprise only an aryl group. The formation of such a monolayer can be verified by measuring its thickness by AFM (Anariba et al., 2003).

It is useful to obtain a monolayer in applications where it is sought to produce the finest layers possible, for example in microelectronics and within the more general framework of the nanotechnologies.

According to an advantageous embodiment of the invention, the conductive or semi-conductive zone of interest of a material, as modified according to the method of the invention, is characterized in that the monomers from which the polymeric layer is obtained are chosen from the compounds comprising at least one terminal double bond, for example, the vinyl compounds (acrylic, methacrylic, styrenic) and in particular styrene, optionally substituted, alkyl acrylates, substituted alkyl acrylates, alkyl methacrylate, substituted alkyl methacrylate, acrylonitrile, methacrylonitrile, acrylamide, methacrylamide, N-alkylacrylamide, N-alkylmethacrylamide, N-dialkylacrylamide, N-dialkylmethacrylamide, isoprene, butadiene, ethylene, vinyl acetate and its derivatives, vinyl ethers, N-vinyl-pyrrolidone, 4-vinylpyridine, 3-vinylpyridine, 2-vinylpyridine, and in particular methyl methacrylate, ethyl methacrylate, propyl methacrylate and its isomers, butyl methacrylate and its isomers, 2-ethylhexyl methacrylate, isobornyl methacrylate, methacrylic acid, benzyl methacrylate, phenyl methacrylate, methacrylonitrile, methylstyrene, methyl acrylate, ethyl acrylate, propyl acrylate and its isomers, butyl acrylate and its isomers, 2-ethylhexyl acrylate, isobornyl acrylate, acrylic acid, benzyl acrylate, phenyl acrylate, glycidyl methacrylate, 2-hydroxyethyl methacrylate, hydroxypropyl methacrylate and its isomers, hydroxybutyl methacrylate and its isomers, N-dimethylaminoethyl methacrylate, 2-(diethylamino)ethylmethacrylate, triethyleneglycol methacrylate, itaconic anhydride, itaconic acid, benzylmethacrylate, 2-(dimethylamino)ethylmethacrylate, 2-(dimethylamino)ethylacrylate, glycidyl acrylate, 2-hydroxyethyl acrylate, hydroxypropyl acrylate isomers, hydroxybutyl acrylate and its isomers, N-diethylaminoethyl acrylate, triethyleneglycol acrylate, N-methylacrylamide, N,N-dimethylacrylamide, N-tert-butylmethacrylamide, N-n-butylmethacrylamide, N-methylolmethacrylamide, N-isopropylacrylamide, N-ethylolmethacrylamide, N-tert-butylacrylamide, N-n-butylacrylamide, N-methylolacrylamide, N-ethylolacrylamide, vinylbenzoic acid and its isomers, diethylaminostyrene and its isomers, methylvinylbenzoic acid and its isomers, diethylamino methylstyrene and its isomers, p-vinylbenzoic acid and its sodium salt, trimethoxysilylpropyl methacrylate, triethoxysilylpropyl methacrylate, diisopropoxymethylsilylpropyl methacrylate, dimethoxysilylpropyl methacrylate, diethoxysilylpropyl methacrylate, dibutoxysilylpropyl methacrylate, disopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilypropyl acrylate, diisopropoxysilylpropyl acrylate, maleic anhydride, N-phenylmaleimide, N-butylmaleimide, butadiene, isoprene, chloroprene, 2-(2-oxo-1-imidazolidinyl)ethyl, 2-methyl-2-propanoate, N-vinyl pyrrolidone, N-vinyl imidazole, 1-[2-[[2-hydroxy-3-(2-propyl)propyl)]amino]ethyl]-2-imidazolidin-one, crotonic acid, vinylsulphonic acid and its derivatives, 2-methacryloyl-oxyethylphosphorylcholine, phosphorylcholine-type monomers, the oligo(ethylene glycol) methacrylates, sulphatoethyl methacrylate ammonium salt, glyceromethacrylate, 2-(N-morpholino)ethyl methacrylate and 2-(N-3-sulphopropyl-N, N-dimethyl ammonium)ethyl methacrylate, as well as the compounds comprising at least one vinylic function such as the telechelics, crosslinking agents.

The preferred monomers are the following:

styrenes polymerized by ATRP:

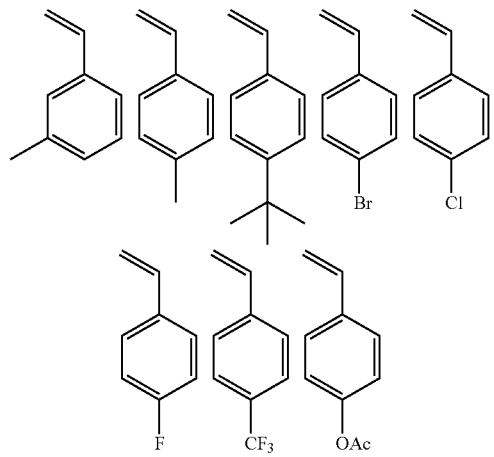

methacrylates polymerized by ATRP:

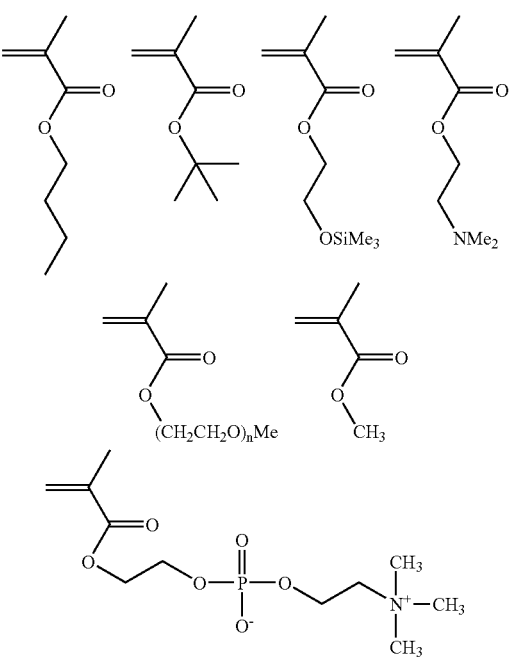

acrylates polymerized by ATRP:

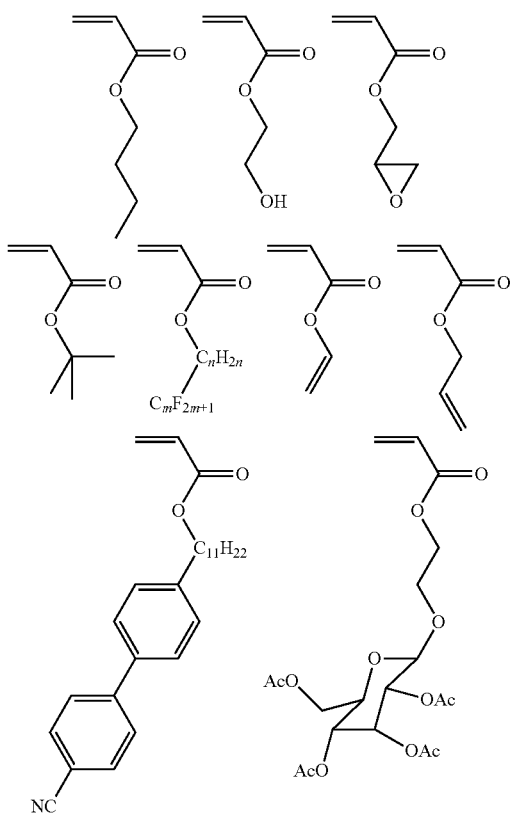

N-isopropylacrylamide polymerized by ATRP:

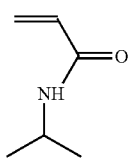

The present invention also relates to a conductive or semi-conductive zone of interest of a material as defined above, modified according to the method of the invention, characterized in that the monomer is chosen from styrene or the mono- or multifunctional derivatives of acrylate and methacrylate.

The present invention also relates to a conductive or semi-conductive zone of interest of a material as defined above, modified according to the method of the invention, characterized in that the polymer of the polymeric layer is chosen from polystyrene or derivatives of polyacrylate or polymethacrylate.

A conductive or semi-conductive zone of interest of a preferred material, as modified according to the method of the invention, is characterized in that the polymer of the polymeric layer is obtained by one of the following polymerization methods: photopolymerization, atom transfer radical polymerization (ATRP), nitroxide mediated polymerization (NMP) or ring opening polymerization (ROP).

According to an advantageous embodiment, the conductive or semi-conductive zone of interest of a material, as defined above and modified according to the method of the invention, is characterized in that said polymer is obtained by polymerization, in particular by atom transfer radical polymerization or by nitroxide mediated polymerization, and in that the end of the chain of said polymer contains a functional group, in particular a halogen atom or a nitroxide group, which can optionally be substituted by copolymers forming a second block or active molecules such as aminoalcohols, allyl alcohols, maleic anhydride, sugars, nucleic acids, peptides, proteins, perfluorinated molecules or molecules with pharmaceutical activity.

More particularly, the conductive or semi-conductive zone of interest of a material as defined above and modified according to the method of the invention is characterized in that said polymer is obtained by polymerization, in particular by atom transfer radical polymerization, and in that the end of the chain of said polymer contains a halogen atom, in particular a bromine atom, which can optionally be substituted by copolymers forming a second block or actives molecules such as aminoalcohols, allyl alcohols, maleic anhydride, sugars, nucleic acids, peptides, proteins, perfluorinated molecules or molecules with pharmaceutical activity.

As indicated in the article by Edmondson et al. (2004), the polymer chains formed by ATRP are functionalized on their end, for example by a halogen atom, and can therefore be used as initiator for the formation of diblock or triblock polymers. For example polystyrene brushes with a thickness of 10 nm have been used for preparing block copolymers PS-b-PMA (PS=polystyrene, PMA=polymethacrylate).

The allyl alcohols and maleic anhydride make it possible to carry out chemical modifications, i.e. to refunctionalize the surface; the sugars, nucleic acids, peptides and proteins relate to biosensors and biocompatible surfaces; the perfluorinated molecules relate in particular to connector technology and protection of surfaces; the molecules with pharmaceutical activity relate to prostheses where the deposition of medicaments makes it possible to improve the compatibility of the latter.

The present invention also relates to a conductive or semi-conductive zone of interest of a material as defined above and modified according to the method of the invention, characterized in that the initiator is a halogenated derivative, in particular brominated or an alkoxyamine-type derivative or an α-hydroxy alkylphenone derivative, an α-dialkoxy acetophenone derivative, a benzoin ether derivative, an α-amino alkylphenone derivative, an aromatic ketone derivative such as benzophenone or anthraquinone, an N-aliphatic or N-aromatic maleimide derivative, a xanthate derivative, a dithiocarbamate derivative, a thioxanthone derivative, a phosphine oxide derivative, or an alcohol, trithiocarbonate or dithioester derivative.

According to an advantageous embodiment, the polymer of the polymeric layer is obtained by atom transfer radical polymerization (ATRP). Within the framework of such a method, the initiator graft comprises a initiator function preferably corresponding to a halogen atom; the conductive or semi-conductive zone of interest thus modified contains a polymer chain terminated by a halogen atom (originating from the initiator) or a chlorine atom (originating from the catalyst used within the framework of the ATRP method).

According to an advantageous embodiment, the polymer of the polymeric layer is obtained by nitroxide mediated polymerization (NMP). Within the framework of such a method, the initiator graft comprises a polymerization initiator function corresponding to a nitroxide group; the conductive or semi-conductive zone of interest thus modified therefore contains a polymer chain terminated by this nitroxide group.

According to an advantageous embodiment, the polymer of the polymeric layer is obtained by ring opening polymerization (ROP). The modified materials thus obtained contain a polymer chain comprising a chain formation of ester functions.

According to an advantageous embodiment, the conductive or semi-conductive zone of interest of a material of the invention, as modified according to the invention, is characterized in that the atom bonds of the graft-atoms of the zone, in particular the covalent carbon-atom bonds of the zone, between the grafts of the under-layer and the surface of said zone are such that they resist ultrasonic washing.

According to a other embodiment advantageous, the conductive or semi-conductive zone of interest of a material of the invention, as modified according to the invention, is characterized in that the polymer constituting the polymeric layer is bound to the grafts of the under-layer via a non hydrolysable covalent bond, and in particular via a carbon-carbon covalent bond.

A conductive or semi-conductive zone of interest of a material particularly advantageous according to the invention, as modified according to the method of the invention, is characterized in that the covalent bond between a graft of the under-layer and a polymer of the polymeric layer is such that it prevents detachment by hydrolysis of the polymer forming said polymeric layer.

The present invention also relates to a conductive or semi-conductive zone of interest of a material as defined above, as modified according to the invention, in which the material is chosen from pure metals or alloys, and in particular iron, nickel, platinum, gold, copper, zinc, cobalt, titanium, chromium, silver, tantalum, steels, in particular stainless steels, titanium alloys, cobalt-chromium alloys, molybdenum, manganese, vanadium, nitinol, or from the semi-conductors, in particular mono- or polycrystalline, doped or undoped silicon, hydrogenated silicon, tantalum nitride, titanium nitride, tantalum nitride, silicon carbide, indium phosphide or gallium arsenide.

A conductive or semi-conductive zone of interest of a preferred material according to the invention, as modified according to the invention, is characterized in that it is biostable, biocompatible and corrosion-resistant, or in that the polymer of the polymeric layer is biodegradable.

The present invention also relates to a method for the modification of the surface of a conductive or semi-conductive zone of interest of a material, in order to obtain a conductive or semi-conductive zone, as defined above, the surface of which is modified, characterized in that it comprises binding onto the surface of this zone a polymerization initiator graft as defined above, in particular bringing said conductive or semi-conductive zone into contact with a diazonium salt solution carrying a polymerization initiator function.

The present invention also relates to a method for the modification of the surface of a conductive or semi-conductive zone of interest of a material as defined above, characterized in that the binding onto the surface of this zone a graft derived from a polymerization initiator as defined above, is carried out by a chemical reaction comprising the bringing into contact of the conductive or semi-conductive zone with a diazonium salt solution carrying a polymerization initiator function in a solvent, in particular an aprotic solvent, or an acid protic solvent, for a sufficient time allowing the binding of the under-layer of grafts as defined above onto the surface of said zone.

The present invention also relates to a method for the modification of the surface of a conductive or semi-conductive zone of interest of a material as defined above, characterized in that the binding to the surface of this zone a graft derived from a polymerization initiator as defined above, is carried out by a heterogeneous electron transfer reaction comprising the bringing into contact of the conductive or semi-conductive zone with a diazonium salt solution carrying a polymerization initiator function in a solvent, in particular an aprotic solvent, or an acid protic solvent, for a sufficient time allowing the binding of the under-layer of grafts as defined above onto the surface of said zone.

The expression "heterogeneous electron transfer reaction" designates a reaction during which a species in solution exchanges an electron with a surface in contact with this solution, according to the following reaction diagram: metal+ A→metal$^+$+A$^-$ (Lund et al., 2001).

The expression "aprotic solvent" designates a solvent which donates protons only with difficulty, such as for example acetonitrile, dimethylformamide or dimethylsulphoxide.

The expression "acid protic solvent" designates a solvent capable of easily providing a proton to which a certain quantity of an acid has been added, for example water, alcohols, their mixtures in the presence of an acid. In fact, the diazonium salts are only stable in medium the pH of which is less than approximately 2.

Within the framework of the present invention, it is possible to graft the diazonium salts in an acid aqueous medium, for example in mixtures of water and another solvent (in acid medium).

The expression "for a sufficient time allowing the binding of the under-layer of grafts onto the surface of the zone" designates the time necessary to obtain an under-layer of sought thickness, which is of the order of an hour.

This embodiment is advantageous to the extent that no electrochemical equipment is required and a simple receptacle for dipping the samples is sufficient.

An advantageous method according to the invention is characterized in that the diazonium salt corresponds to the formula ArN$_2$$^+$X$^-$, in which Ar represents an aromatic group carrying a function capable of initiating polymerization as defined above and X$^-$ represents an anion advantageously chosen from the halogens, sulphates, phosphates, the perchlorates, tetrafluoroborates, carboxylates and hexafluorophosphates.

The present invention also relates to a method for the modification of the surface of a conductive or semi-conductive zone of interest of a material, in order to obtain a conductive or semi-conductive zone the surface of which is modified as defined above, characterized in that it comprises the binding onto the surface of this zone an initiator graft as defined above, by electrochemical reduction of a diazonium salt carrying a polymerization initiator function, by bringing the conductive or semi-conductive zone into contact with a solution of the diazonium salt in a solvent.

This embodiment makes it possible to obtain very thick under-layers of as much as a micron.

According to an advantageous embodiment, the method of the invention is characterized in that the graft binding stage is a stage of electrochemical reduction of the diazonium salt and involves negatively polarizing the conductive or semi-conductive zone of interest of a material with respect to a reference electrode or an anode also in contact with the diazonium salt solution, the anode and the cathode optionally being able to be separated from each other, for example by a diaphragm or membrane.

A preferred method of the invention is a method as defined above, characterized in that the electrochemical reduction takes place in the presence of an electrolyte, the anodic and cathodic compartment being optionally separated, the anodic compartment optionally comprising the solvent and the electrolyte, the cathodic compartment optionally comprising the solvent, the electrolyte and the diazonium salt.

According to an advantageous embodiment, the method of the invention is characterized in that the diazonium salt corresponds to the formula $ArN_2^+X^-$, in which Ar represents a aromatic group carrying a polymerization initiator function as defined above and $X^-$ represents an anion, the anion $X^-$ of the diazonium salt being advantageously chosen from the halogens, sulphates, phosphates, perchlorates, tetrafluoroborates, carboxylates and hexafluorophosphates.

The present invention also relates to a method for the modification of the surface of a conductive or semi-conductive zone of interest of a material as defined above, characterized in that it comprises the following stages:

a stage of binding onto the surface of said zone a polymerization initiator graft as defined above by bringing the conductive or semi-conductive zone into contact with a diazonium salt solution carrying a polymerization initiator function in a solvent, said binding stage being in particular carried out by electrochemical reduction of the diazonium salt, making it possible to obtain a conductive or semi-conductive zone with a surface modified by covalent binding of said initiator grafts onto its surface, said grafts forming an under-layer as defined above, and a stage of non-anionic polymerization, in particular radical or by ring opening (ROP), said non-anionic polymerization reaction involving a monomer as defined above and the initiator function carried by the graft of the under-layer, which leads to the formation of the polymer constituting the polymeric layer as defined above.

Such polymerizations initiated from the surface ("grafting from" polymerization) allow easy control of the functionality, density and thickness of the brushes obtained.

A method for the modification of the surface of an advantageous conductive or semi-conductive zone according to the invention is characterized in that it comprises a stage of polymerization by photopolymerization, involving bringing said conductive or semi-conductive zone of a surface modified by covalent binding of initiator grafts onto its surface, into contact with at least one monomer as defined above, and subjecting the mixture formed by said conductive or semi-conductive material and said monomer to electromagnetic or actinic radiation, in particular UV radiation, in order to initiate the polymerization, said polymerization reaction involving a monomer as defined above and the initiator function carried by the graft of the under-layer, which leads to the formation of the polymer constituting the polymeric layer as defined above.

This embodiment is used for surfaces with complicated shapes and is carried out at ordinary temperature.

A method for the modification of the surface of an advantageous conductive or semi-conductive zone according to the invention is characterized in that it comprises a stage of polymerization by atom transfer radical polymerization (ATRP), consisting of bringing said conductive or semi-conductive zone of a surface modified by covalent binding of initiator grafts onto its surface, into contact with at least one monomer as defined above, and to activate said initiators by a transition metal complex, in order to convert said initiators to radicals capable of reacting with the monomer, said polymerization reaction involving a monomer as defined above and the initiator function carried by the graft of the under-layer, which leads to the formation of the polymer constituting the polymeric layer as defined above.

In this embodiment, the initiator function carried by the graft of the under-layer, grafted onto the surface, is activated by a transition metal complex in order to produce a radical capable of reacting with said monomer. The method is a living polymerization making it possible to control the length of the chains and form block copolymers.

The advantage of this embodiment resides in the possibility of growing brushes from the surface using a large variety of monomers; the character of controlled living polymerization makes it possible to obtain polymer chains with a low polymolecularity index possessing functionalized chain terminations and which can therefore be used as macroinitiator in order to produce di- or triblock copolymers. This method is also used for surfaces with complex shapes where the "grafting onto" method could only be carried out with difficulty.

A method for the modification of the surface of an advantageous conductive or semi-conductive zone according to the invention is characterized in that it comprises a stage of polymerization corresponding to a nitroxide mediated polymerization (NMP), involving bringing said conductive or semi-conductive zone of a surface modified by covalent binding of initiator grafts onto its surface, into contact with at least one monomer as defined above, and thermally activating said initiators, in order to convert them, by means of homolytic cleavage, to radicals capable of reacting with the monomer, said polymerization reaction involving a monomer as defined above and the initiator function carried by the graft of the under-layer, which leads to the formation of the polymer constituting the polymeric layer as defined above.

In this embodiment, the initiator function carried by the graft is an alkoxyamine function which is activated thermally, which causes homolytic cleavage and produces a radical capable of reacting with said monomer. The process is a living polymerization making it possible to control the length of the chains, form block copolymers and obtain chains with a low polymolecularity index.

A method for the modification of the surface of an advantageous conductive or semi-conductive zone according to the invention is characterized in that it comprises a stage of polymerization by ring opening polymerization (ROP), consisting of bringing said conductive or semi-conductive zone, of a surface modified by covalent binding of initiator grafts onto its surface, into contact with at least one cyclic monomer as defined above, and with an organometallic catalyst making it possible to open said cyclic monomer and create the polymerization active centre, said polymerization reaction involving a monomer as defined above and the initiator function carried by the graft of the under-layer, which leads to the formation of the polymer constituting the polymeric layer as defined above.

This embodiment can be carried out starting with a large number of commercial polymers and is a controlled living polymerization making it possible to obtain chains with low polydispersity.

The ring opening polymerization (ROP) of cyclic esters leads to biocompatible and biodegradable aliphatic polyesters. The ring opening mechanism is based on a coordination-insertion reaction of an aluminium, tin or rare-earth alcoholate, with the ester bond of the cyclic monomer. The appropriate catalyst can be obtained in situ by ligand exchange with an alcohol (the grafted initiator in this case containing a hydroxyl function) and a catalyst such as tin octanoate or triethyl aluminium, aluminium or lanthanide triisopropanoate.

Ring opening polymerization is a controlled living polymerization which, from a OH, NH or $SO_2CF_3$ functionalized surface, in the presence of a catalyst such as $Et_3Al$, $Sn(Oct)_2$, makes polymerization possible by ring opening of the cyclic monomers such as lactones, lactides and oxazolines. Within the framework of the present invention, the initiator fixed onto the surface, i.e. onto the under-layer, is an aryl group in particular substituted by a hydroxyl or hydroxyalkyl group.

The present invention also relates to a method for the modification of the surface of a conductive or semi-conductive zone as defined above, characterized in that it comprises the following stages:

a stage of binding onto the surface of said zone a graft derived from a diazonium salt and carrying a polymerization initiator function as defined above, by bringing the conductive or semi-conductive zone into contact with a solution of said diazonium salt carrying said polymerization initiator function in a solvent, said binding stage being in particular carried out by heterogeneous electron transfer reaction or by chemical reaction, making it possible to obtain a conductive or semi-conductive zone of a surface modified by covalent binding of initiator grafts to its surface, said grafts forming an under-layer as defined above, and a stage of non-anionic polymerization by photopolymerization, atom transfer radical polymerization (ATRP), nitroxide mediated polymerization (NMP) or ring opening polymerization (ROP), said polymerization reaction involving a monomer as defined above and the initiator from which the graft of the under-layer is derived, which leads to the formation of the polymer constituting the polymeric layer as defined above.

This embodiment makes it possible to grow from the surface polymer chains of substantially equal length and this method is also used for surfaces with complex shapes where "grafting onto" can only be carried out with difficulty.

A method for the modification of the surface of an advantageous conductive or semi-conductive zone according to the invention is characterized in that it comprises a stage of polymerization by photopolymerization, consisting of bringing said conductive or semi-conductive zone of surface modified by covalent binding of initiator grafts onto its surface, into contact with at least one monomer as defined above, and subjecting the mixture formed by said conductive or semi-conductive zone and said monomer to electromagnetic or actinic radiation, in particular UV radiation, in order to initiate polymerization, said polymerization reaction involving a monomer as defined above and the initiator function carried by the graft of the under-layer, which leads to the formation of the polymer constituting the polymeric layer as defined above.

A method for the modification of the surface of an advantageous conductive or semi-conductive zone according to the invention is characterized in that it comprises a stage of polymerization by atom transfer radical polymerization (ATRP), consisting of bringing said conductive or semi-conductive zone of a surface modified by covalent binding of initiator grafts onto its surface, into contact with at least the one monomer as defined above, and activating said initiators by a transition metal complex, in order to convert said initiators to radicals capable of reacting with the monomer, said polymerization reaction involving a monomer as defined above and the initiator function carried by the graft of the under-layer, which leads to the formation of the polymer constituting the polymeric layer as defined above.

A method for the modification of the surface of an advantageous conductive or semi-conductive zone according to the invention is characterized in that it comprises a stage of polymerization corresponding to a nitroxide mediated polymerization (NMP), consisting of bringing said conductive or semi-conductive zone of a surface modified by covalent binding of initiator grafts onto its surface, into contact with at least one monomer as defined above, and thermally activating said initiators, in order to convert them, by means of homolytic cleavage, to radicals capable of reacting with the monomer, said polymerization reaction involving a monomer as defined above and the initiator function carried by the graft of the under-layer, which leads to the formation of the polymer constituting the polymeric layer as defined above.

This embodiment is used for surfaces with complicated shapes and is carried out at ordinary temperature.

A method for the modification of the surface of an advantageous conductive or semi-conductive zone according to the invention is characterized in that it comprises a stage of polymerization corresponding to a ring opening polymerization (ROP), consisting of bringing said conductive or semi-conductive zone of a surface modified by covalent binding of initiator grafts onto its surface, into contact with at least one cyclic monomer as defined above, and with an organometallic catalyst making it possible to open said cyclic monomer and create the active polymerization centre, said polymerization reaction involving a monomer as defined above and the initiator function carried by the graft of the under-layer, which leads to the formation of the polymer constituting the polymeric layer as defined above.

According to an advantageous embodiment, the method of the invention can comprise a photochemical initiation stage before the ATRP or NMP polymerization stage.

The present invention also relates to a method as defined above, characterized in that the radical polymerization stage is carried out in the presence of a solvent and a catalyst such as a transition metal complex.

The present invention also relates to a method as defined above, characterized in that the radical polymerization stage is carried out in the presence of an external initiator such as a halogenated derivative, in particular brominated or an alkoxyamine-type derivative or an α-hydroxy alkylphenone derivative, an α-dialkoxy acetophenone derivative, a benzoin ether derivative, β-amino alkylphenone derivative, an aromatic ketone derivative such as benzophenone or anthraquinone, an N-aliphatic or N-aromatic maleimide derivative, a xanthate derivative, a dithiocarbamate derivative, a thioxanthone derivative, a phosphine oxide derivative, or an alcohol, trithiocarbonate or dithioester derivative.

The use of an initiator in solution makes it possible to grow polymer chains in solution and therefore to verify the criteria which the polymerization must satisfy.

The present invention also relates to a conductive or semi-conductive zone as obtained by implementation of the method defined above.

The present invention also relates to the use of a conductive or semi-conductive zone as defined above, for the preparation of:

an object of any form whatever constituted by material comprising said zone, or metallic surfaces having enhanced resistance to corrosion, or stents, implants, prostheses or elements which can be used in microelectronics.

The present invention also relates to the use of a conductive or semi-conductive zone as defined above, for the preparation of materials comprising the conductive or semi-conductive zones having an additional layer, in particular an additional polymeric layer constituted by block copolymers, or an additional functional layer constituted by active molecules such as aminoalcohols, allyl alcohols, maleic anhydride, sugars, nucleic acids, peptides or proteins.

The present invention also relates to a diazonium salt corresponding to one of the following chemical formulae:

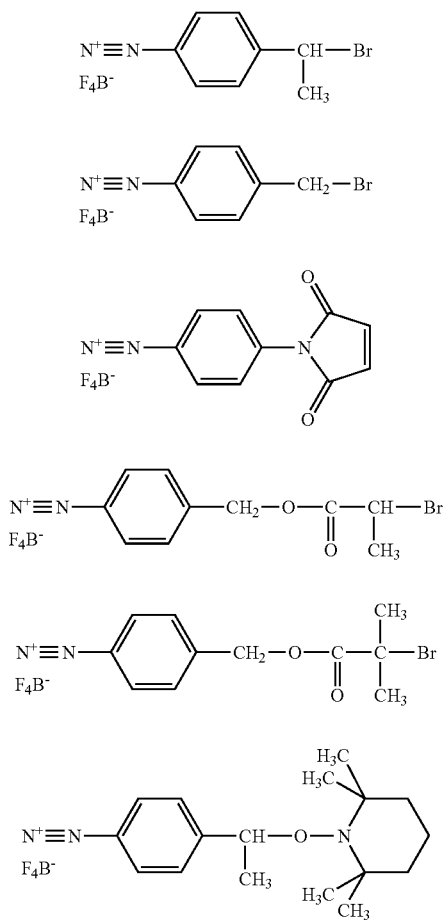

DESCRIPTION OF THE FIGURES

FIGS. 8A, 8B, 8C, 8D and 8E represent respectively AFM images for Fe, Fe+1, Fe+1+PMMA without initiator in solution, Fe+1+PAnBu without initiator in solution and Fe+1+PMMA with an initiator in solution.

DETAILED DESCRIPTION OF THE INVENTION

I—Grafting and ATRP Polymerization

Diagram 1

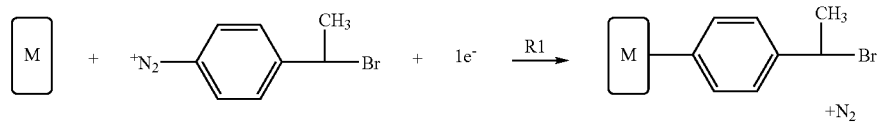

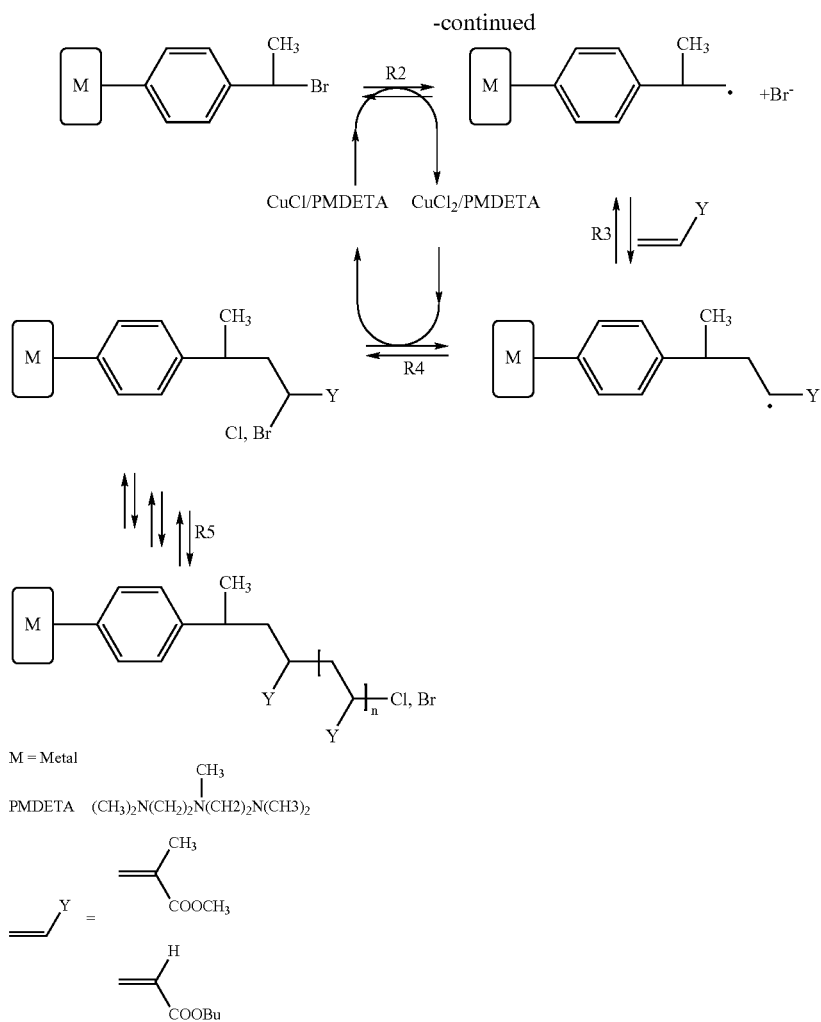

Figure 1:
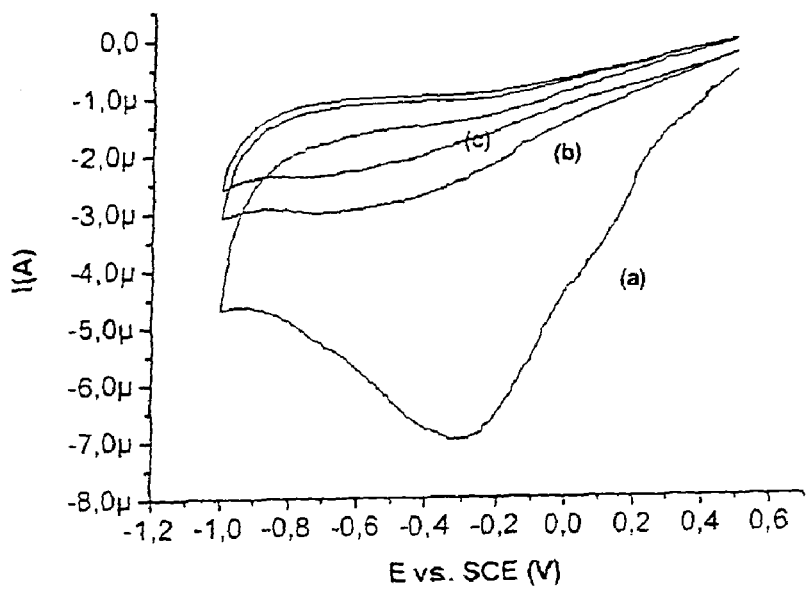
FIG. 1 represents the voltammogram of 1 in an acetonitrile solution (ACN)+0.1M NBu$_4$BF$_4$ on a vitreous carbon electrode (Reference ECS. v=0.2 Vs$^{-1}$: (a) first cycle, (b) second cycle, (c) third cycle).

M = Metal
PMDETA  $(CH_3)_2N(CH_2)_2N(CH_2)_2N(CH_3)_2$

1—Fixing the Graft onto the Metal 1-1. Synthesis of the Diazonium Salts

The starting amines were synthesized by a "one pot" procedure from 1-(4-aminophenyl)ethanol and (4-aminophenyl)methanol. Two original diazonium salts $BF_4^{-+}N_2C_6H_4CH(CH_3)Br$ 1 and $BF_4^{-+}N_2C_6H_4CH_2Br$ 2 were synthesized by standard diazotation methods.

Synthesis of 1

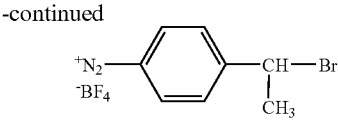

1 g of 2-amino-5-methylbenzylalcohol (7.28.10−3 mol; 1 eq.) and 1.23 g of tetramethylammonium bromide (8.10−3 mol; 1.1 eq) are placed in 5 ml of an aqueous solution of 48% hydrobromic acid (1.82.10−2 mol; 2.5 eq.) in a 50 ml flask. The solution obtained is left under stirring at 150° C., under an argon atmosphere for 15 hours. A yellow precipitate is formed. The reaction mixture is cooled down to 0° C., 5 mL of an aqueous solution of 48% tetrafluoroboric acid (1.68.10−2 mol; 5.6 eq.) cooled down beforehand to 0° C. is added. Stirring is maintained for 15 minutes. 0.55 g of sodium nitrite (8.10−3 mol; 1.1 eq.) is dissolved in a minimum amount of demineralized water. The solution obtained is cooled down to 0° C. then it is added progressively to the reaction medium. A brown precipitate appears. Stirring is maintained for 30 minutes at 0° C., then the solution is placed in the refrigerator overnight so that the diazonium salt precipitates. After filtration on sintered glass, the precipitate is washed with an aqueous solution of 5% sodium tetrafluoroborate, methanol, and diethyl ether, then it is dried under vacuum. A brown powder is obtained.

Synthesis of 2

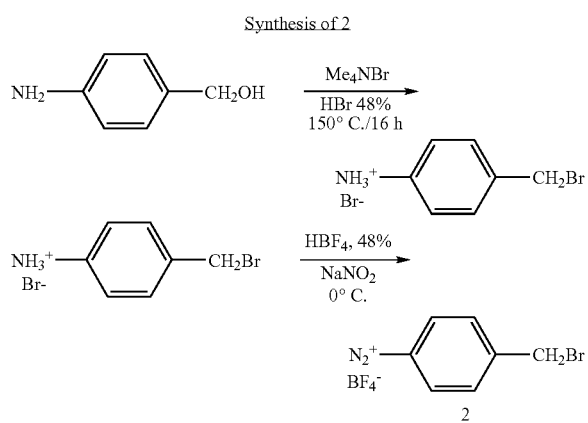

0.5 g of 2-aminobenzylalcohol (4.6.10−3 mol, 1 eq.) and 0.78 g of tetramethylammonium bromide (5.06.10⁻³ mol; 1.1 eq) are placed in 5 ml of an aqueous solution of 48% hydrobromic acid (1.82.10⁻² mol; 3.96 eq.) in a 50 ml flask. The solution obtained is left under stirring at 150° C., under an argon atmosphere for 15 hours. A yellow precipitate is formed. The reaction mixture is cooled down to 0° C., 4.5 mL of an aqueous solution of 48% tetrafluoroboric acid (1.64.10⁻² mol; 3.56 eq.) cooled down beforehand to 0° C. is added. Stirring is maintained for 15 minutes. 0.34 g of sodium nitrite (5.06.10⁻³ mol; 1.1 eq.) is dissolved in a minimum amount of demineralized water. The solution obtained is cooled down to 0° C., then it is added progressively to the reaction medium. A brown precipitate appears. Stirring is maintained for 30 minutes at 0° C., then the solution is placed in a refrigerator overnight so that the diazonium salt precipitates. After filtration on sintered glass, the precipitate is washed with an aqueous solution of 5% sodium tetrafluoroborate, methanol, and diethyl ether, then it is dried under vacuum. A brown powder is obtained.

1-2. Grafting of the Aryl Groups

The reactions were carried out on carbon electrodes, then transposed onto iron (FIG. 1). A monoelectronic, broad, irreversible wave is observed at $Ep_c$=−0.31 V/SCE which corresponds to the concerted reduction of the diazonium salts to aryl radical which reacts with the iron surface according to reaction R1 (see Diagram 1). During the successive scannings, the height of this wave becomes very low as is usual with diazonium salts, the surface being progressively blocked by the grafting of aryl groups. On iron, this wave cannot be observed, the iron being too easily oxidized.

Figure 2:
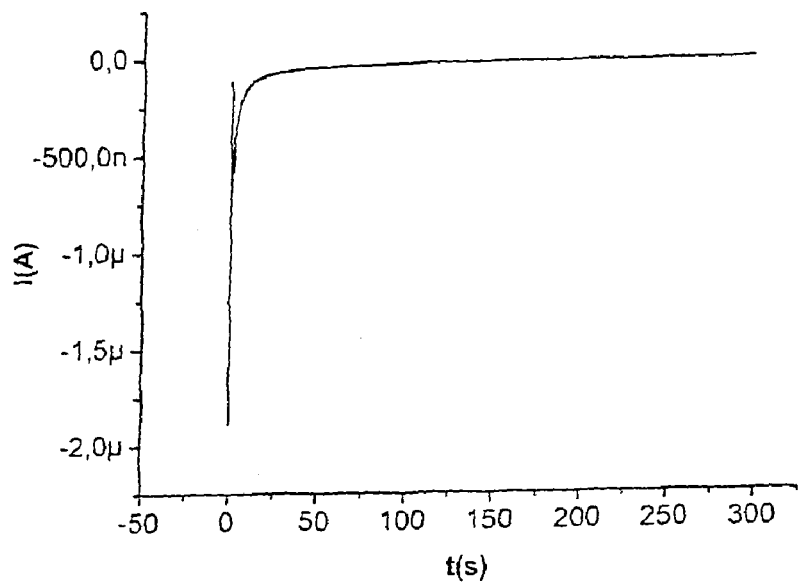
FIG. 2 represents the result of chronoamperometry on an iron electrode in an ACN solution+0.1M NBu$_4$BF$_4$+2 mM of 1. (E=−0.85 V/SCE. Reference ECS).

The iron electrodes are carefully polished with diamond paste (1 µm) then ultrasonically rinsed in deoxygenated acetone for 5 minutes in order to avoid to the maximum extent oxidation of the surface. In order to carry out the grafting the operation proceeds by chronoamperometry by applying voltages more negative (ΔE=−0.54 V) than the peak measured on carbon (and more cathodic than the voltage for iron oxidation). FIG. 2 shows a sharp drop in current which corresponds to the blocking of the electrode.

After grafting, the electrodes are carefully ultrasonically rinsed in ACN in order to eliminate the molecules which would only be physically adsorbed on the surface.

It is also possible to carry out the grafting by simple immersion of the iron plate treated as previously in a deoxygenated solution with an argon stream 20 mM of 1 or 2 for one hour.

1-3. Characterization of the Grafted Surface by Cyclic Voltammetry

Figure 3:
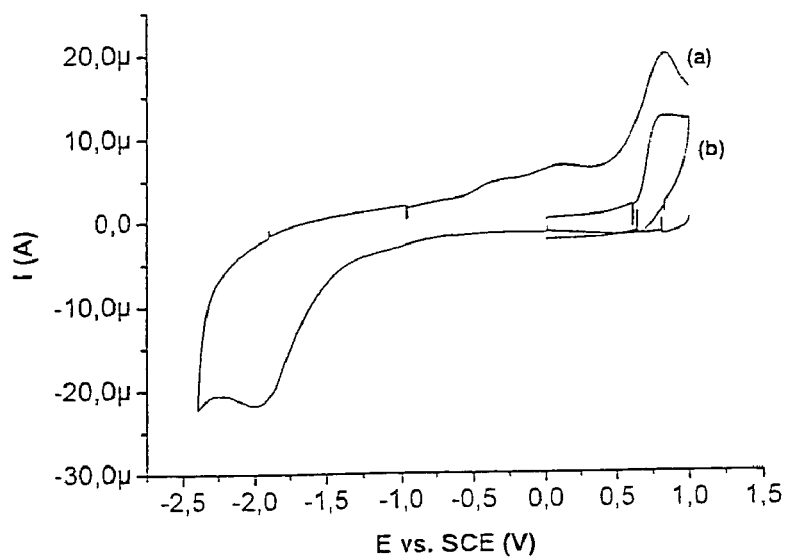
FIG. 3 represents the result of cyclic voltametry a) of a vitreous carbon electrode grafted by 2: CV+2 in an ACN solution+0.1 M NBu$_4$BF$_4$ and b) an NEt$_4$Br solution (1 mM) on a clean vitreous carbon electrode (Reference ECS. v=0.2 Vs$^{-1}$).
Figure 4:
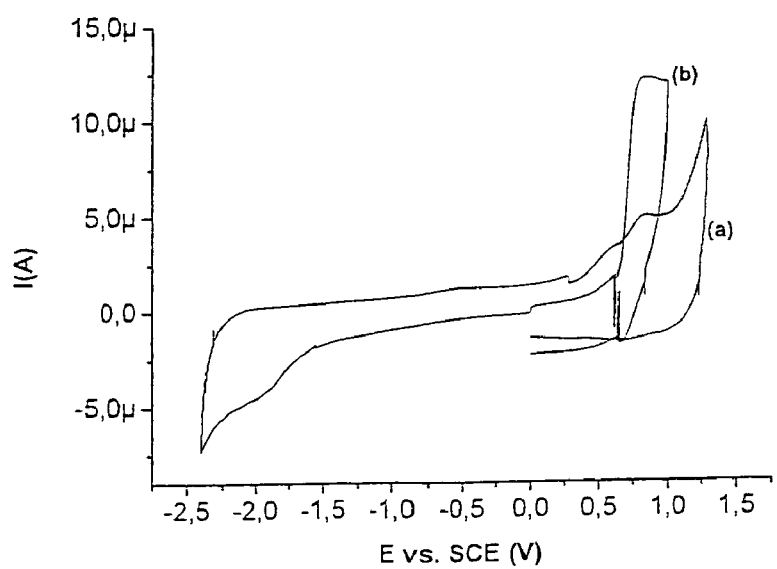
FIG. 4 represents the result of cyclic voltametry a) of a vitreous carbon electrode grafted by 1: CV+1 in an ACN solution+0.1 M NBu$_4$BF$_4$ and b) an NEt$_4$Br solution (1 mM) on a clean vitreous carbon electrode (Reference ECS. v=0.2 Vs$^{-1}$).

After careful rinsing of the electrode in acetone in an ultrasonic bath, it is transferred into a solution containing only the solvent and the electrolyte (ACN+0.1 M $NBu_4BF_4$). FIG. 3 shows the voltammogram of a vitreous carbon electrode grafted by reduction of 2: CV+2; an irreversible wave is observed at $Ep_c$=−1.98 V/SCE corresponding to the reduction of the C—Br bond. On the return scan, a peak is observed at $Ep_a$=+0.83 V/SCE which corresponds to the oxidation of the bromide formed at the level of the cathodic peak. By comparison, the reduction of benzyl bromide under the same conditions produces a peak at $Ep_c$=−1.95 V/SCE and the oxidation of tetraethylammonium bromide leads to a peak at $EP_a$=0.86 V/SCE. A similar voltammogram is obtained in the case of 1: CV+1 (FIG. 4). The cathodic and anodic peaks therefore correspond respectively to the reactions R6 and R 7 of Diagram 2 below.

Diagram 2

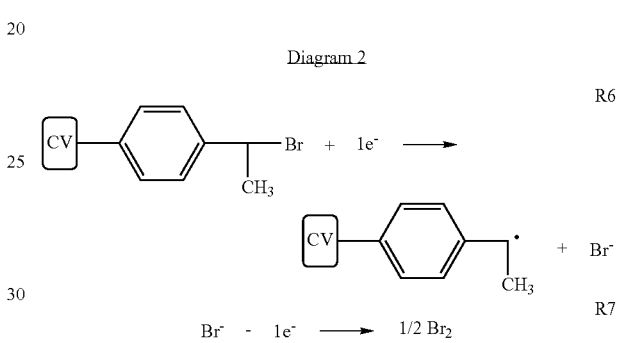

The two voltammograms of FIGS. 3 and 4 therefore prove the grafting of the vitreous carbon surface by the aryl groups originating from 1 and 2.

1-4. Characterization of the Surface Grafted by IR Spectroscopy

Figure 5:
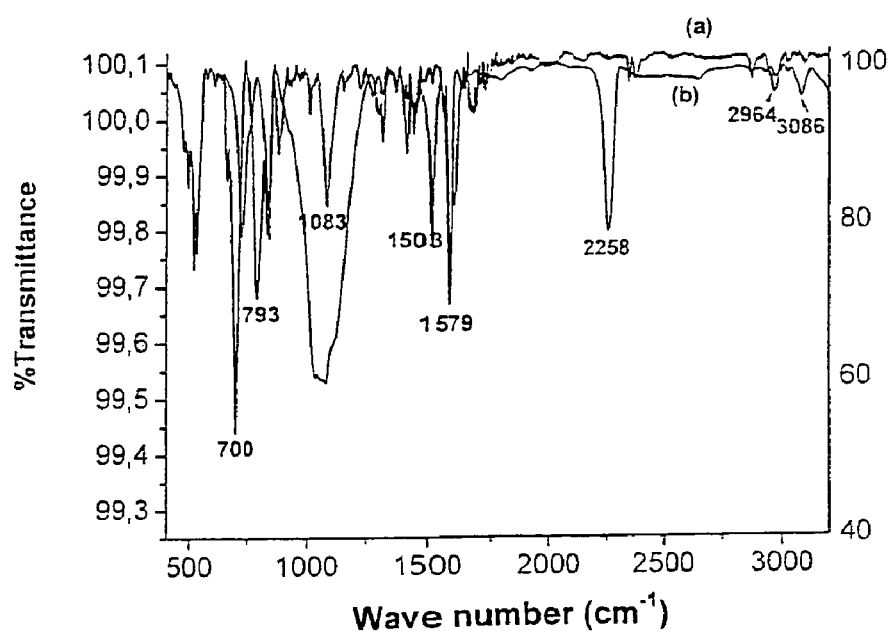
FIG. 5 represents the IRRAS spectrum of: (a) Fe+1 and (b) 1 before grafting.

FIG. 5 represents the IR spectrum by reflection (IRRAS) of an iron surface grafted by 1: Fe+1.

The most striking difference between the spectrum of the diazonium and the spectrum of the grafted organic layer is the absence of the band at 2258 cm⁻¹ indicating that the diazonium has indeed been reduced and is not only adsorbed on the surface. The signature of the aromatic group with the ring vibration at 1579 and 1508 cm⁻¹; the vibrations in the plane of the C—H bonds at 1083 cm⁻¹ and finally the vibrations of C—H outside the plane at 834, 793 and 700 cm⁻¹ are clearly observed on the spectrum of Fe+1. An interesting difference is observed in the zone of the CHs; whilst the vibrations of the aromatic ring are clearly visible in the spectrum of 1 at 3086 cm⁻¹, they disappear to the benefit of the aliphatic CH vibrations at 2964 cm⁻¹ in the spectrum of Fe+1. This is due to the selection rules which encourage vibrations the dipolar moment of which is perpendicular to the surface, as may be partly the case with the vibrations of the aliphatic CH of 1. This is probably the same effect which is responsible for the attenuation of the band at 1083 cm⁻¹ in the spectrum of Fe+1.

1-5. Characterization of the Surface Grafted by XPS

Figure 6:
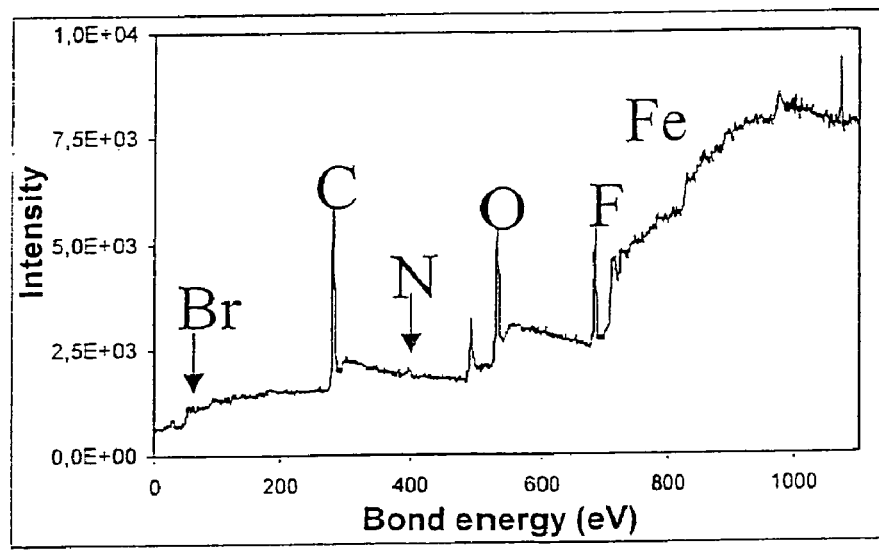
FIG. 6 represents the XPS spectrum of an iron surface grafted by 1: Fe+1.
Figure 7:
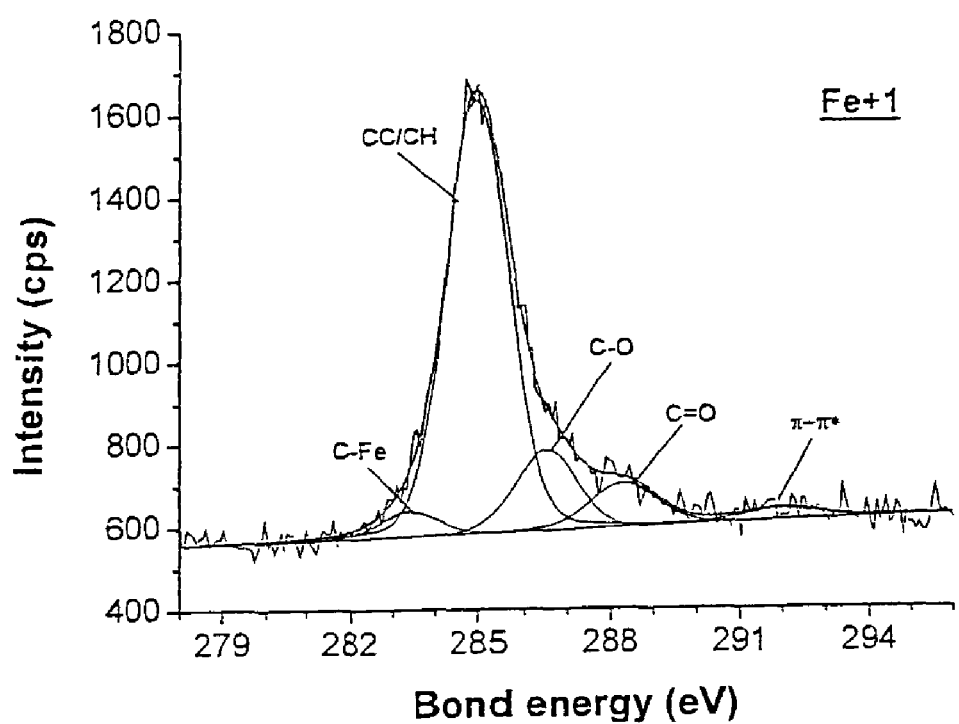
FIG. 7 represents the XPS spectrum of the C1s of an Fe+1 sample.

FIG. 6 represents the wide scan spectrum of a surface Fe+1. The presence of the iron peak is observed thus indicating the presence of a relatively thin organic layer (less than the XPS analysis depth which is approximately 5 nm). The peak of the bromine at 69 eV and that of the carbon at 285 eV prove the presence of the organic layer (but also of an external contamination as regards the carbon). The oxygen at 530 eV corresponds to the residual presence of oxide on the surface whilst the nitrogen (400 eV) also originates from a contamination by the atmosphere, whilst the fluorine (685 eV) very probably corresponds to traces of electrolyte remaining on the surface despite rinsing the samples. FIG. 7 shows the spectrum of the C1s peak of the carbon of a sample of Fe+1, a shoulder is observed corresponding after deconvolution to a peak situated at 283.2 eV which is indicative of carbon bonded to the metal, by comparison the iron carbide appears at 283 eV.

The spectroscopic characterizations described above clearly show that the brominated grafts have indeed been fixed onto the surface of the iron. It will now be shown that it is possible starting with these grafts used as iniatiators to make the polymers grow on the surface. The surfaces grafted by simple immersion of the plate have characteristics similar to those described above.

2—Polymer Growth from the Graft 2-1. Polymerization

The experimental conditions for the grafting have been adjusted by using an initiator in solution and we have verified that the polymerization clearly shows the atom transfer radical polymerization (ATRP) criteria.

Two monomers were used: on the one hand methyl methacrylate (MMA) and on the other hand n-butyl acrylate (AnBu), which should produce respectively methyl polymethacrylate (vitreous transition temperature Tg=100° C.) and n-butyl polyacrylate (Tg=−55° C.). Typical experimental conditions are shown in Table 1 below; the previously grafted pellets as described above are immersed in the polymerization solutions (see experimental conditions in Table 1).

After this stage, the iron plates are carefully ultrasonically rinsed in dichloromethane. A test was carried out in order to verify that the rinsing cycle was sufficient to eliminate the polymer residues adsorbed on the iron surface. An iron plate placed in contact with a PMMA-toluene solution is heated for 4 hours at 90° C. in the absence of initiator and copper chloride. Then, after 4 ultrasonic washings in dichloromethane lasting 5 minutes, analysis of the plate by IRRAS reveals no polymer signal. At this time, PMMA remains in the rinsing solvent (IR analysis) but the polymer has completely disappeared from the chloroform after a fifth washing. As this rinsing cycle was applied to the iron plates immersed in the polymerization solutions containing Cu/Cl and the initiator, the signals characteristic of PMMA and PAnBu using IRRAS and XPS can be attributed to the grafted and non-adsorbed polymer (FIGS. 10, 11, 12, 13, 14).

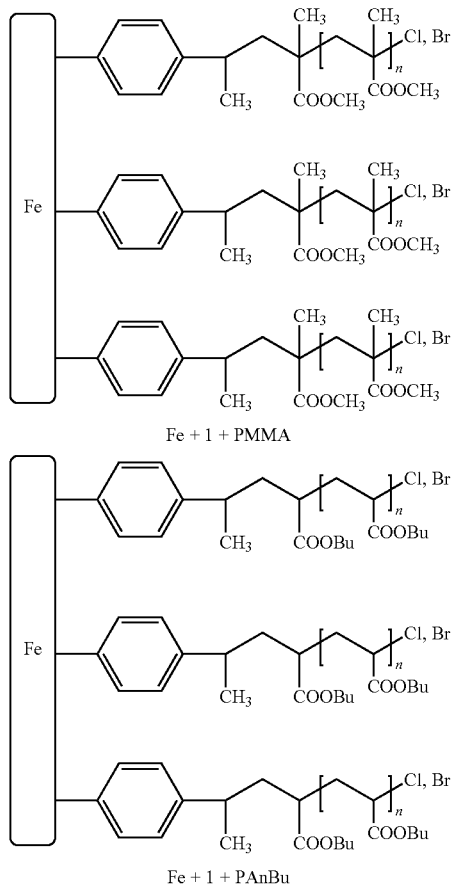

Fe + 1 + PMMA

Fe + 1 + PAnBu 2-2-1. Characterization by AFM.

FIGS. 8A, 8B, 8C and 8D show the images obtained by AFM on plates of Fe, Fe+1, Iron+1+PMMA and Iron+1+PAnBu. These two last cases involve the grafted polymer coverings without the use of initiator in solution but only the initiator bonded with the iron substrate, but also an Iron+1+PMMA surface obtained in the presence of an initiator added to the solution.

TABLE 1

Experimental conditions for polymerization by ATRP[a]

| Solvent | Monomer | [Mono] | [1-PEBr] | [PMDETA] | [Cu(I)Cl] | [Cu(II)Cl] | Cu(II)/Cu(I) |
|---|---|---|---|---|---|---|---|
| Toluene | MMA | 4.78 | $2.4 \cdot 10^{-2}$ | $1.3 \cdot 10^{-2}$ | $8.0 \cdot 10^{-3}$ | $4.0 \cdot 10^{-3}$ | 0.5 |
| Toluene | MMA | 4.78 | 0 | $1.3 \cdot 10^{-2}$ | $8.0 \cdot 10^{-3}$ | $4.0 \cdot 10^{-3}$ | 0.5 |
| Toluene | AnBu | 5.80 | $4.7 \cdot 10^{-2}$ | $2.3 \cdot 10^{-2}$ | $2.1 \cdot 10^{-2}$ | $2.0 \cdot 10^{-3}$ | 0.09 |
| Toluene | AnBu | 5.80 | 0 | $2.4 \cdot 10^{-2}$ | $2.1 \cdot 10^{-2}$ | $2.3 \cdot 10^{-3}$ | 0.11 |

[a]Concentrations in mol $L^{-1}$. T = 90° C.; [Initiator]/[PMDETA]/[Cu] = 2/1/1; [MMA]/[Initiator] = 200; [AnBu]/[Initiator] = 120;

(b) the solutions which have been degassed beforehand containing the ligand PMDETA: pentamethylediethylenetriamine (see Diagram 1), the monomer and the initiator 1-PEBr are added under a nitrogen atmosphere to the pellet iron and copper chloride. Reaction time: MMA 250 minutes for an approximate monomer conversion rate of approximately 40%, AnBu 400 minutes for a conversion rate of 80%.

2-2. Characterization of the Surfaces Covered with Polymer

The surfaces obtained from the diazonium salt 1 should have the following formulae:

The image shows that the morphology of the iron surface is clearly modified by the grafting of the initiator and the consequent polymer coating. The maximum roughness increases in the direction Fe<Iron+1<Iron+1+PAnBu<Iron+1+

PMMA. The differences between the maximum heights obtained on Iron+1 and Iron+1+polymer can reach a hundred nanometers. Thus, in FIG. 8E, representing Iron+1+PMMA with an initiator, the thickness reaches approximately 200 nm, which shows that it is possible to obtain relatively thick coatings.

Figure 9:
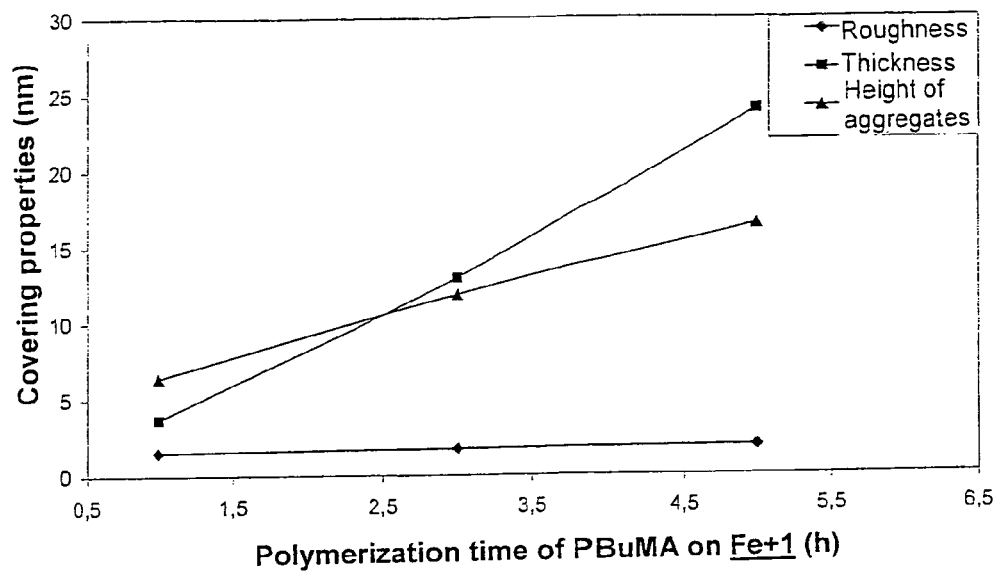
FIG. 9 represents the thickness and the roughness of the layer of polymer PMAnBu as a function of the polymerization time. The curve with the diamonds corresponds to the measurement of the roughness of the polymer layer, that with the squares to the thickness of the polymer layer and that with the triangles to the height of the aggregates. The y-axis corresponds to the roughness of the polymer layer, the thickness of the polymer layer or the height of the aggregates in mm. The x-axis represents the ATRP polymerization time in hours.

FIG. 9 represents the variation in thickness of the grafted layer, the height of the aggregates which can be observed on the surface and the roughness of the latter as a function of the polymerization time of PAnBu on a surface Fe+1. It is thus observed that when the layer grows, the roughness remains constant which confirms the fact that dense brushes are obtained: the polymer chains lengthen but their differences in length do not change with their size.

2-2-2. Characterization by XPS

Figure 10:
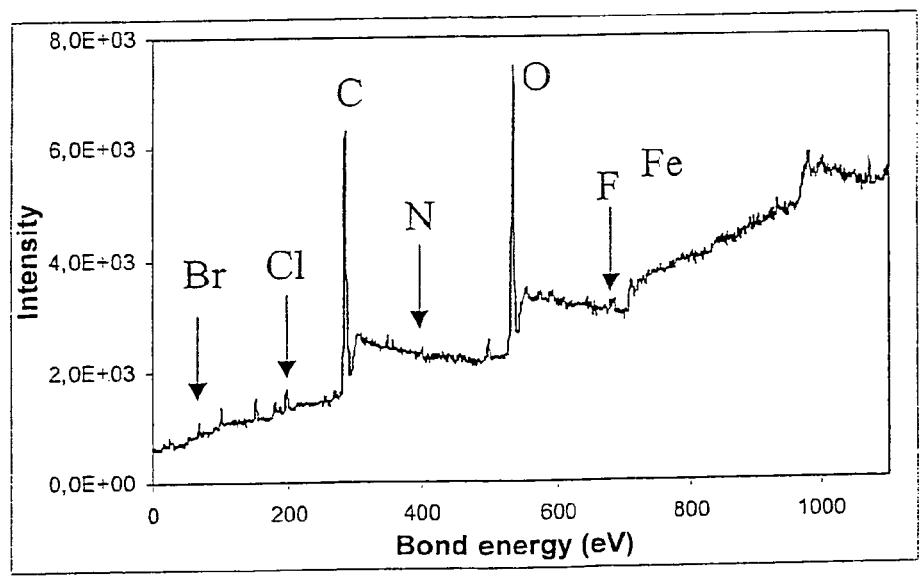
FIG. 10 represents the XPS spectrum of an Fe+1+PMMA sample.
Figure 11:
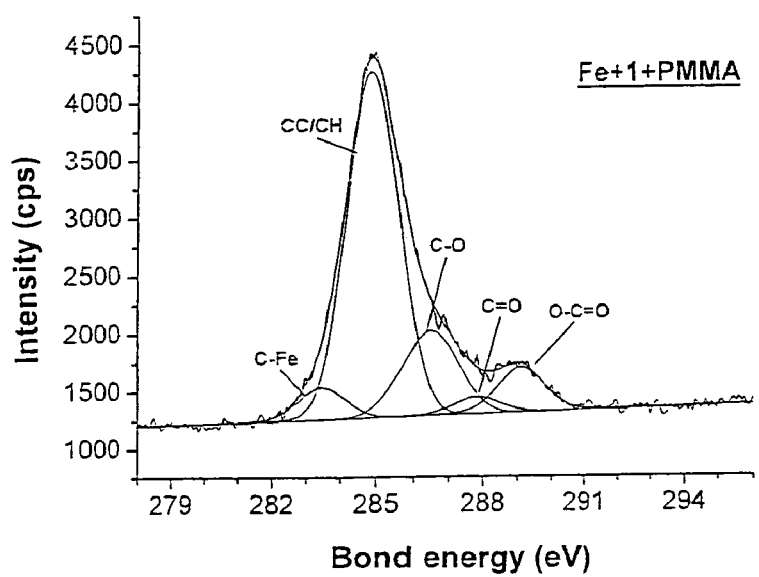
FIG. 11 represents the XPS spectrum of the C1s of Fe+1+PMMA (prepared with an initiator in solution).

FIG. 6 shows the spectrum of an iron surface grafted by the diazonium salt 1. FIG. 10 has the same surface after MMA grafting, i.e., covered with PMMA (Fe+1+PMMA). It shows a clear increase in the relative intensities of the C1s and O1s lines relative to that of iron. Table 2 shows the surface compositions for the surfaces grafted by 1 then covered with polymers.

TABLE 2

XPS analysis of the surface

|  | C | N | O | Fe | Cu | Br | Cl | F |
|---|---|---|---|---|---|---|---|---|
| Fe + 1 | 57.9 | 1.6 | 22.9 | 3.5 | 0.0 | 1.1 | 0.0 | 13 |
| Fe + 1 + PMMA | 62.3 | 1.7 | 27.8 | 0.9 | 0.6 | 1.5 | 4.2 | 1.1 |
| Fe + 1 + PAnBu | 63.1 | 2.8 | 23.8 | 3.0 | 0.1 | 0.4 | 0.3 | 1.15 |

An increase in the relative proportion of carbon after grafting of the polymers is observed. The surface percentage of oxygen increases more particularly in the case of PMMA, which is richer in oxygen than PAnBu. The percentage of iron reduces substantially, above all in the case of PMMA, clearly indicating the growth of an organic layer on the surface. The slight decline during the polymerization of AnBu indicates either a finer layer, or an irregular layer with many faults.

It is interesting to note that for Iron+1 the line $Br_3d$ is centred at 70.8 eV, a clear indication of the presence of bromine in an organic environment and more particularly in a C—Br bond. However, after the growth of polymers chains, the presence of bromine is persistent at the surface of the grafted plates. This suggests that all the diazonium salts, which are analogues of grafted ATRP initiators, do not react. Moreover, on the surface of Iron+1+polymer, a low bond energy shoulder indicates the possibility of the existence of bromide ions, probably trapped by the polymer, which have not been able to be eliminated during the ultrasonic washing cycle.

In the case of Iron+1+PAnBu, the chlorine is detected by its principal Cl2p line centred at 199.2 eV. This value is close to the lower limit of the bond energy range for Cl2p in PVC (196.5-198 ev). Unquestionably this shows that the chlorides originating from the catalyst react with the growing grafted chains of polymers in order to finally constitute the terminations of the latter (see Diagram 2) in the form of —$CH_2$—$CH_2$—Cl.

In order to verify whether the ATRP is effectively initiated at the surface, we compared the chemical composition of the surface of iron plates treated in the presence or in the absence of initiator added in solution (Table 3). It appears that the absence of initiator in solution does not prevent polymerization taking place at the surface and that is due to the prior grafting of the brominated diazonium salt by electrochemical reduction at the surface of the iron. The higher value of the atomic percentage of carbon in the absence of initiator in solution appears to indicate the presence of longer macromolecular chains.

TABLE 3

XPS analysis of the surface in the presence and in the absence of initiator in the solution.

|  | C | N | O | Fe | Cu | Br | Cl | F |
|---|---|---|---|---|---|---|---|---|
| Fe + 1 + PAnBu without initiator | 68.9 | 2.1 | 20.0 | 2.0 | 1.5 | 2.3 | 0.5 | 0.4 |
| Fe + 1 + PAnBu with initiator | 63.1 | 2.8 | 23.8 | 2.3 | 0.1 | 0.4 | 0.3 | 1.1 |

Figure 12:
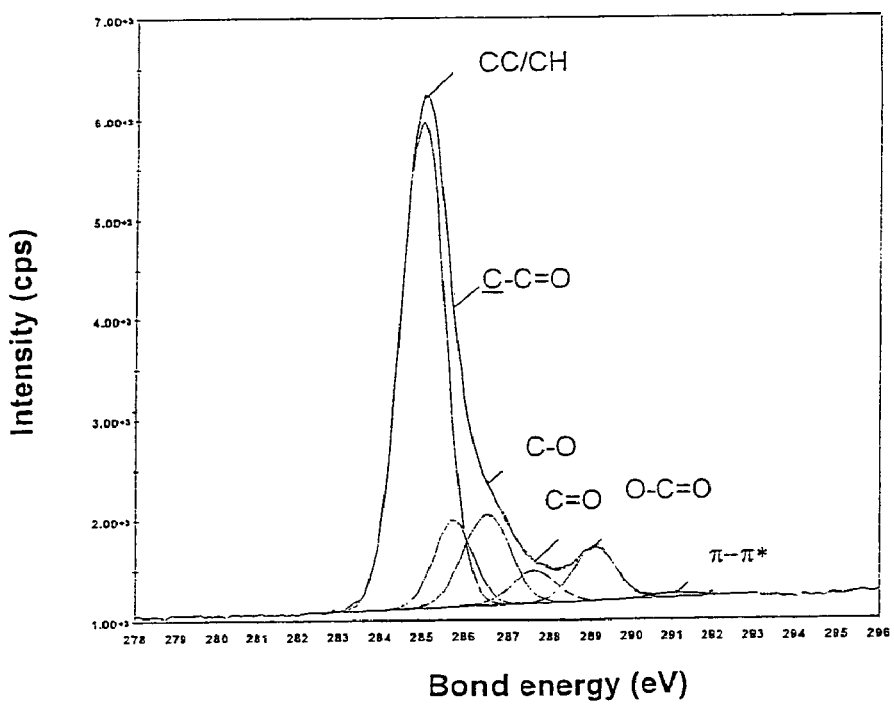
FIG. 12 represents the XPS spectrum of the C1s of Fe+1+PAnBu (prepared without initiator in solution).

The high-resolution spectrum of the C1s of Iron+1+PMMA (FIG. 11) shows a component centred at 289 eV, characteristic of the carbon O—C=O of PMMA, the same is true for the Iron+1+PAnBu represented in FIG. 12.

The results of the XPS analysis therefore demonstrate the presence of the two polymers on the surface of the iron.

2-2-3. Characterization by IRRAS

Figure 13:
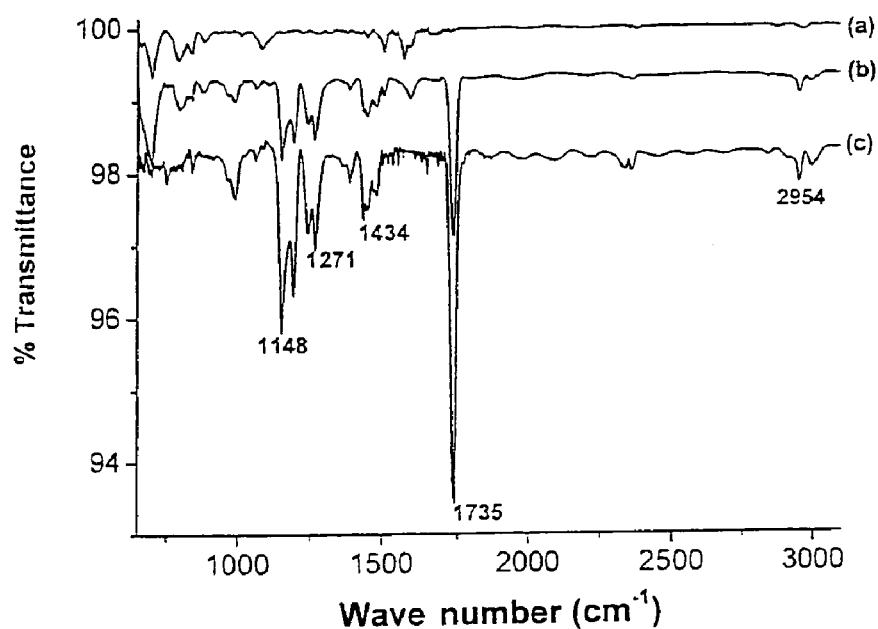
FIG. 13 represents the IRRAS spectrum of (a): Fe+1, (b): Fe+1+PMMA with initiator in the solution, (c): Fe+1+PMMA without initiator in the solution.
Figure 14:
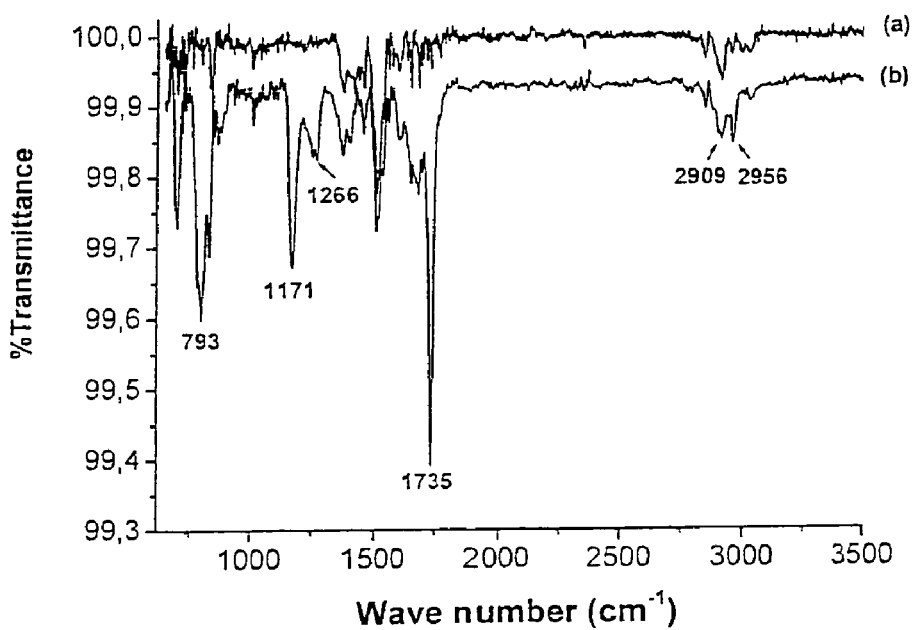
FIG. 14 represents the IRRAS spectrum of (a): Fe+1, (b): Fe+1+PAnBu with initiator in the solution.

FIG. 13 shows the spectra of Fe+1 and of Fe+1+PMMA with and without initiator in solution. The most remarkable difference between the spectrum of Fe+1 and the other two is the appearance, after the polymerisation stage, of a very intense band at 1735 $cm^{-1}$ which signifies the presence of the polymer by its carbonyl pendant group. This proof of the existence of the grafted PMMA on the surface is reinforced by the appearance of broad and symmetrical bands at 1271 and 1148 $cm^{-1}$ which are characteristic of the C—O bond. The same is true for Fe+1+PAnBu (see FIG. 14).

The IRRAS spectra therefore irrefutably confirm the presence of the polymer on the surface.

II—Grafting and Polymerization Using Nitroxides (NMP)

Polymerization using nitroxides is a controlled polymerization method based on the reversible blocking of the carrier radical of the active chain by a nitroxide radical. It has been used to grow, on silicon, polystyrene brushes of more of 100 nm (Huang et al., 2001). As indicated in Diagram 5 (see hereafter), an initiator comprising an alkoxyamine function is grafted onto the surface. During heating, the alkoxyamine group attached to the surface is cut in order to produce the alkyl radical and the stable nitroxide radical: TEMPO. Recombination of the styrenic radical with the stable nitroxide radical (TEMPO) leads to a new alkoxyamine which is capable of thermal decomposition. The establishment of an equilibrium between dormant species and active species thanks to the reversible blocking of the chain in growth by the TEMPO radical makes it possible to limit the termination reactions and thus control the propagation stage.

1—Synthesis and Grafting of the Diazonium Salt

The diazonium salt of Diagram 5 was synthesized from the corresponding amine in $HBF_4$ in the presence of $NaNO_2$. This diazonium salt is grafted electrochemically while maintaining the voltage of an iron pellet treated as previously for 300 s at –0.8 V/SCE in ACN+0.1 M $NBu_4BF_4$. The grafting of the initiator was verified by XPS which shows a ratio C/N=19 and O/N=1.3 which is close to that which is expected for the grafted surface (C/N=17 and O/N=1)(Diagram 4).

2. Polymerization from the Grafted Alkoxyamine

The iron pellet grafted as above is immersed in distilled styrene (10 mL) and the temperature is taken to 130° C. for 24 hours. The pellet is then washed with dichloromethane (cycles of 5 minutes, ultrasonically) in order to remove the polystyrene which is only deposited on the surface. The presence of polystyrene on the surface is confirmed by IRRAS by comparison with a standard polystyrene film.

Diagram 4
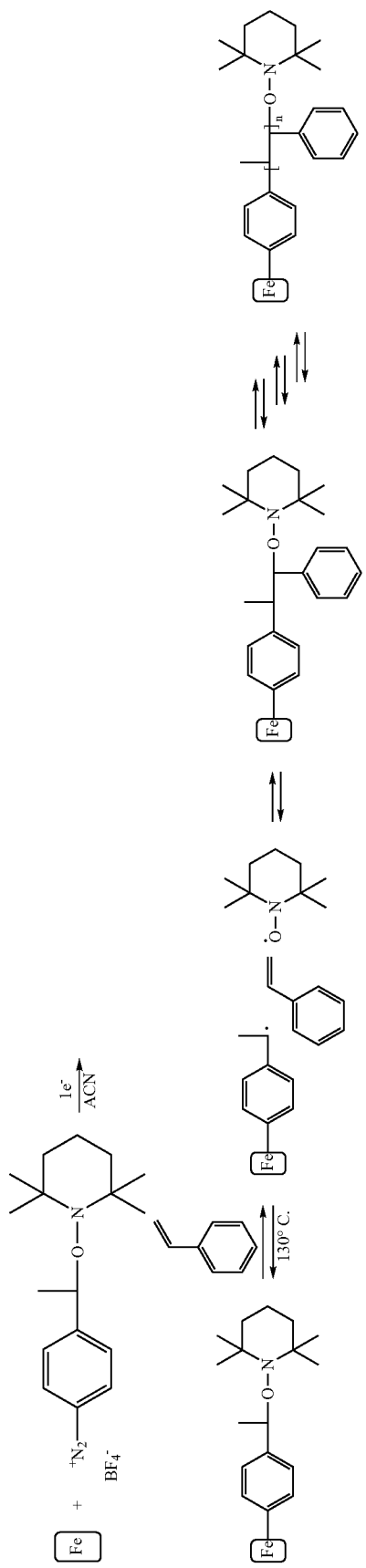

III—Grafting and Ring Opening Polymerization (ROP)

Ring opening polymerization of cyclic esters produces biocompatible, biodegradable and bioresorbable aliphatic polyesters. The polymers synthesized by this method are poly(ε-caprolactone), poly(lactide), poly(γ-valerolactone), poly(glycolic acid), poly(β-propiolactone). Poly(ε-caprolactone) is a polymer which is of interest as it is miscible with many other polymers.

The polymerization is carried out by a coordination-insertion mechanism starting from an initiator of tin octoate (Sn(oct)$_2$) or aluminium triisopropanolate (Al(OiPr)$_3$) or triethylaluminium (AlEt$_3$) type (cf. Diagram 5). The aluminium or tin alcoholates can be formed in situ by exchange with available hydroxyl functions. In the present case, the hydroxyl function can be provided by the diazonium salt grafted onto the iron surface (cf. Diagram 6).

Diagram 5: Polymerization mechanism by coordination-insertion

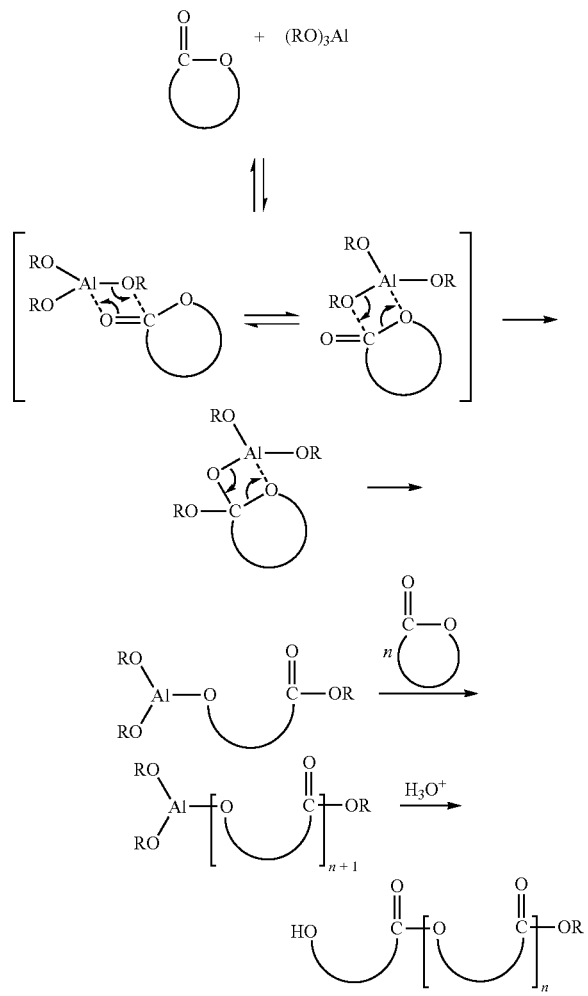

1. Synthesis and Grafting of the Diazonium Salt

The diazonium salt of 4-aminophenol $^+N_2C_6H_4OH$, 4-aminobenzyl alcohol $^+N_2C_6H_4CH_2OH$ and 2-(4-aminophenyl)ethanol was synthesized according to standard diazotation methods by NaNO$_2$ in HBF$_4$ acid medium. These three compounds show in cyclic voltammetry an irreversible and broad wave situated respectively at Ep=−0.28, −0.39, −0.12 V/SCE. The grafting is carried out by maintaining the voltage 300 mV more negative than the peak for 300 s in ACN+0.1 M NBu$_4$BF$_4$. The grafted surface shows by IRRAS the signal characteristic of the alcohol groups at 3380 cm$^{-1}$.

2. Ring Opening Polymerization from Hydroxylated Grafts

Diagram 6.

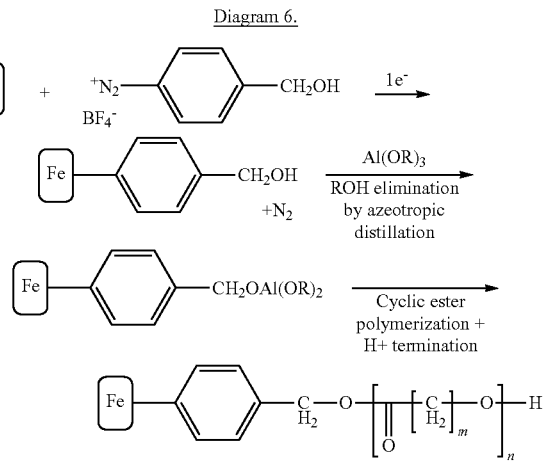

The monomers (ε-caprolactone) and the solvent (toluene) are purified by distillation on CaH$_2$. The iron plate containing the hydroxyl functions is purified by azeotropic distillations of toluene on a cold wall (elimination of traces of water). The solutions of monomer (ε-caprolactone c=10$^{-2}$ mol L$^{-1}$) and initiator (aluminium tri-isopropylate c=10$^{-3}$ mol L$^{-1}$) are then added to the toluene (20 mL) by cannula transfer under an inert atmosphere of nitrogen and the polymerization is carried out at 100° C. for 20 hours. The pellet is then ultrasonically rinsed carefully for 20 minutes in toluene then ether. An IRRAS spectrum of the surface shows a peak characteristic of the ester function at 1730 cm$^{-1}$.

IV—General Photopolymerization Protocol

A small quantity of formulation to be polymerized is deposited using a pipette onto a stainless steel slide covered with an under-layer which had been electrografted beforehand. The film is then formed by spreading the formulation using a "wire-coater" (allowing a given thickness to be obtained). The stainless steel slide is arranged on a glass plate before being exposed to UV light. The exposure is carried out using a Fusion F300S UV lamp mounted on a model LC6E conveyor.

After irradiation, the stainless steel slides are cleaned with acetone in order to eliminate any non-polymerized monomer.

Parameters which can be Varied:

Thickness of the deposit: 10 or 26 μm depending on the "wire-coater" used.

Dose of radiation received: controlled by the transport speed of the conveyor as well as by the number of passes under the lamp.

Irradiation range: controlled by the type of lamp used (H or D) (Fusion UV Systems, Inc., Md., USA).

The bulbs used are quartz bulbs comprising a mixture of inert gases constituted by argon, neon and mercury under mean pressure. When a current is applied, the temperature of the mixture increases and vaporizes the small quantity of mercury present: a mercury vapour arc is therefore generated; this corresponds to a bulb of type H with emission maxima between 240-270 nm and 350-380 nm. The bulbs of type D are prepared by adding a dopant in order to modify the emission maxima.

The quantity of radiation received by the samples as well as the choice of lamp are dictated by the formulation to be polymerized as well as by the nature of the electrografted photoinitiator (PI).

EXAMPLES

| | | |
|---|---|---|
| 1) Formula: | | 79.9% SR610 (polyethylene glycol 600 diacrylate (monomer for radical polymerization); Cray-Valley) + 20% SR454 (ethoxylated trimethylolpropane triacrylate (monomer for radical polymerization); Cray-Valley) + 0.1% triethanolamine (TEA) |
| | photoinitiator (PI): | benzophenone |
| | Thickness: | 26 μm |
| | Dose: | 20 passes at a belt transport speed of 2 cm/s |
| | Bulb: | D |
| 2) Formula: | | 79.5% SR610 + 20% SR454 + 0.5% TEA |
| | PI: | benzophenone |
| | Thickness: | 26 μm |
| | Dose: | 5 passes at a belt transport speed of 2 cm/s |
| | Bulb: | D |
| 3) Formula: | | 79.5% SR610 + 20% SR454 + 0.5% TEA |
| | PI: | benzophenone |
| | Thickness: | 26 μm |
| | Dose: | 3 passes at a belt transport speed of 2 cm/s |
| | Bulb: | D |
| 4) Formula: | | 79% SR610 + 20% SR454 + 1% TEA |
| | PI: | benzophenone |
| | Thickness: | 26 μm |
| | Dose: | 2 passes at a belt transport speed of 2 cm/s |
| | Bulb: | D |
| 5) Formula: | | 79% SR610 + 20% SR454 + 1% TEA |
| | PI: | benzophenone |
| | Thickness: | 26 μm |
| | Dose: | 1 pass at a belt transport speed of 1.5 cm/s |
| | Bulb: | D |
| 6) Formula: | | 79.5% SR610 + 20% SR454 + 0.5% TEA |
| | PI: | maleimide |
| | Thickness: | 26 μm |
| | Dose: | 5 passes at a belt transport speed of 2 cm/s |
| | Bulb: | D |

Synthesis with Stainless Steel Slides Starting from the Diazonium Salt Derived from Benzophenone The tests are carried out in a 0.1N sulphuric acid medium and the diazonium salt derived from benzophenone is used at a concentration of $2.10^{-3}$ M.

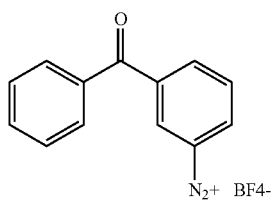

The work electrode is a 316L stainless steel electrode which is cleaned with a detergent and ultrasonically rinsed with distilled water.

The counter electrode is a platinum sheet. The surface area ratio between the counter electrode and the work electrode is at least 3.

The reference electrode is a silver electrode ($Ag/AgClO_4$).

A continuous flow of argon into the solution allows the oxygen to be driven off.

The electrochemical synthesis technique used is cyclic voltammetry. Several attempts are made by modifying the final scanning voltage, and by keeping the other parameters fixed, namely a scanning speed of 200 mV/s and number of cycles carried out of 10, the initial voltage being the equilibrium voltage. The tests were carried out with three final voltages: −1, −1.3 and −1.5 V/($Ag/Ag^+$).

And in all three cases the infrared analysis makes it possible to show that the stainless steel surface is clearly modified, by the presence of the carbonyl band characteristic of the graft at 1665 $cm^{-1}$ (C=O), 1600 $cm^{-1}$ (elongation C=C).

Synthesis with Stainless Steel Slides Starting with 4-Diazonium N-Phenylmaleimide Tetrafluoroborate

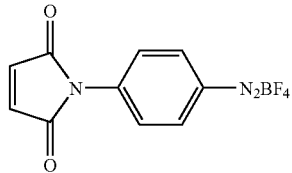

The tests are carried out in a medium of 0.1 N sulphuric acid and the 4-diazonium N-phenylmaleimide tetrafluoroborate salt derived from benzophenone is used at a concentration of $2.10^{-3}$ M.

The electrodes used are the same as in the previous case. Argon is bubbled through the solution throughout the experiments.

The electrochemical synthesis technique used is cyclic voltammetry. Several attempts are made by modifying the scanning speed, and by keeping the other parameters fixed, namely a final voltage of −1.7 V/($Ag/Ag^+$) and number of cycles carried out of 10, the initial voltage being the equilibrium voltage. The tests were carried out with three scanning speeds: 20, 50 and 200 mV/s.

And in all three cases the infrared analysis makes it possible to show that the stainless steel surface is clearly modified, by the presence of the carbonyl band characteristic of the graft at 1730 $cm^{-1}$ (C=O), 1600 and 1535 $cm^{-1}$ (elongation C=C).

Synthesis with Stainless Steel Slides Starting from Irgacure

The tests are carried out in an organic medium, using dimethylformamide (DMF) as solvent, tetraethylammonium perchlorate at a concentration of $5.10^{-2}$ M as salt, 4-nitro benzene diazonium salt at a concentration of $2.10^{-3}$ M as polymerization initiator and the monomer irgacure (1-[4-(2-hydroxyethoxy)-phenyl]-2-hydroxy-2-methyl-1-propane-1-one, CIBA) at a concentration of 2 M.

The electrodes used are the same as in the previous cases. Argon is bubbled through the solution throughout the experiments.

The electrochemical synthesis technique used is cyclic voltammetry. Several attempts are made by modifying the scanning speed (20 and 50 mV/s), and the number of cycles (10 and 20). The final voltage is −3 V/($Ag/Ag^+$), and the initial voltage is the equilibrium voltage.

The infrared analysis makes it possible to show that the surface is clearly modified by the polymer, as the characteristic bands are present, although their intensity is quite low (less than 1% of transmittance): 3350 $cm^{-1}$ (OH), 1672 $cm^{-1}$ (C=O), ~1600 $cm^{-1}$ (elongation C=C).

V—Immobilization of Human Serum Albumin (HSA) on Vitreous Carbon Surfaces Modified by PS and PMMA The immobilization of HSA on films of PMMA (Methyl Polymethacrylate) and PS (polystyrene) grafted by ATRP (Atom Transfer Radical Polymerization) onto vitreous carbon plates treated with 1 (see Example 1) was carried out at ambient temperature in an aqueous solution (0.1 M $CH_3COONa$—$CH_3COOH$) at pH 5 and with a protein concentration of 6 mg/ml. The vitreous carbon plates covered with polymer brushes (according to the operating method described above) were incubated in the protein solution, under stirring, for 24 hours. After incubation, the substrates (plates on which the HSA proteins have been immobilized) were washed 3 times for 30 minutes in an aqueous solution 5% (v/v) of Tween 20 (surfactant) and then 3 times with distilled water for 30 minutes, in order to eliminate the physisorbed protein molecules. After drying, the vitreous carbon plates modified by the polymer brushes and immobilizing the proteins were dried under vacuum for one hour and stored under ultra-high vacuum in the preparation room of the XPS installation.

The HSA protein thus immobilized on said plates is adsorbed by electrostatic interactions or by Van der Waals interactions or by hydrogen bonds.

The materials modified according to the present invention therefore make it possible to control the adsorption of proteins with polymer brushes which are more or less hydrophilic and more or less dense.

Figure 15A:
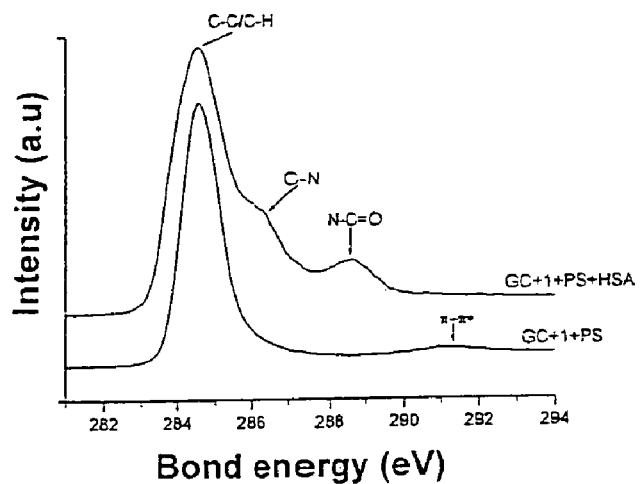
FIG. 15A represents the high resolution C1s lines of GC+1+PS (vitreous carbon plates treated by the diazonium salt 1 and onto which a polystyrene film has been grafted) and of GC+1+PS+HSA (vitreous carbon plates treated by the diazonium salt 1 and onto which a polystyrene film has been grafted and on which HSA has been immobilised).
Figure 15B:
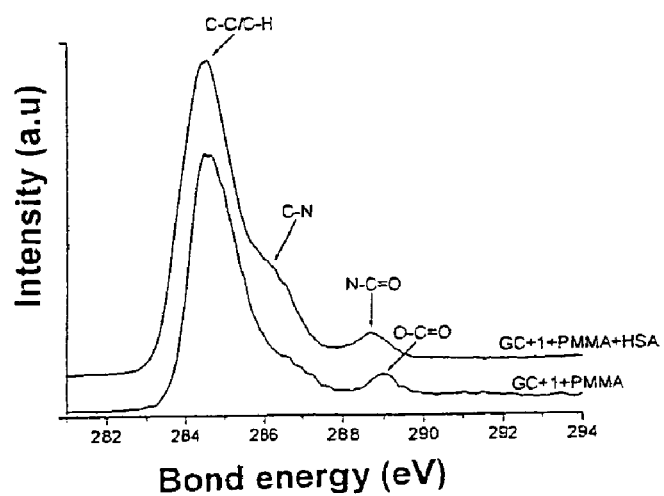
FIG. 15B represents the high resolution C1s lines of GC+1+PMMA (vitreous carbon plates treated with diazonium salt 1 and onto which a methyl polymethacrylate film has been grafted) and of GC+1+PMMA+HSA (vitreous carbon plates treated with diazonium salt 1 and onto which a methyl polymethacrylate film has been grafted and on which HSA has been immobilised).

FIGS. 15A and 15B show the C1s spectra at high resolution of GC+1+PS, GC+1+PS+HSA, GC+1+PMMA and GC+1+PMMA+HSA. After immobilization of HSA, the substrates GC+1+PS and GC+1+PMMA show C1s lines the fine structures of which are significantly modified due in particular to the components centred at 286.2 and 288.6 eV, characteristic of carbon in, respectively, the chemical environments C—N/C—O and N—C=O characteristic of the physisorbed protein.

REFERENCES

Adenier, A.; Cabet-Deliry, E.; Lalot, T.; Pinson, J; Podvorica, F. (2002) *Chem Mat* 14, 4576

Allongue, P.; Delamar, M.; Desbat, B.; Fagebaume, O.; Hitmi, R.; Pinson, J.; Savéant, J.-M. (1997) *J. Am. Chem. Soc.*, 119, 201

Anariba, F. A.; DuVall, S. N.; McCreery, R. L. (2003) *Anal. Chem.*, 75, 3837-3844

Baum, M.; Brittain, J. W. (2002) *Macromolecules*, 35, 610

Baute, N.; Martinot, L.; Jérôme, R. (1999) *J. Electroanal. Chem.*, 472, 83

Beck, F.; Michaelis, R.; Scholten, F.; Zinger, B. (1994) *Electrochim. Acta*, 39, 229

Bernard, M. C.; Chaussé, A.; Cabet-Deliry, E.; Chehimi, M.; Pinson, J.; Podvorica, F.; Vautrin-Ul, C. (2003) *Chem. Mat.*, 15, 3450

Biethan, U. et al. (1991) Paints and Coatings in Ullmann's Encyclopedia of Industrial Chemistry, Vol A18, 5° edition, VCH, Weinheim, p. 359

Boenig, H. V. (1984) Plasma Chemical Vapor of Organic Thin Films in Advances in Low-Temperature Plasma Chemistry, Technology, Applications, Boenig, H. V., ed., Technomic Publishing Company, Lancaster (USA), p. 183

Bureau, C.; Defranscheschi, M.; Delhalle, J.; Deniau, G.; Tanguy, J.; Lécayon, G. (1994) *Surface Science,* 311, 349

Bureau, C.; Deniau, G.; Viel, P.; Lécayon, G. (1997) *Macromolecules,* 30, 333

Calberg, C.; Kroonen, D.; Mertyens, M.; Jérôme, R.; Martinot, L. (1998) Polymer, 39, 23

Calberg, C.; Mertens, M.; Jérôme R.; Arys, X.; Jonas, A. M.; Legras, R. (1997) *Thin Film Solids,* 310, 148.

Charlier, J.; Bureau, C.; Lécayon, G. (1999) *J. Electroanal. Chem.*, 465, 200

Cheung, K. M.; Bloor, D.; Stevens, G. C. (1988) *Polymer,* 29, 1709

Claes, M.; Voccia, S.; Detrembleur, C.; Jérôme, C.; Gilbert, B.; Leclère, Ph.; Geskin, V. M.; Gouttebaron, R.; Hecq, M.; Lazzaroni, R.; Jérôme, R. (2003) *Macromolecules,* 36, 5926 d'Agostino, R. (1997) Plasma Processing of Polymers, Academic Press, New York

Deniau, G.; Lécayon, G.; Viel, P.; Hennico, G.; Delhalle, J. (1992) *Langmuir,* 8, 267

Deniau, G.; Lécayon, G.; Bureau, C.; Tanguy J. (1997) in *Protective Coatings and Thin Films* Pauleau, Y.; Barna, P. B. Eds, Kluwer Academic, Amsterdam, pp. 265-278

Deniau, G.; Thome, T.; Gaudin, D.; Bureau, C.; Lécayon, G. (1998) *J. Electroanal. Chem.*, 451, 145

Detrembleur, C.; Jérôme, C.; Claes, M.; Louette P.; Jérôme, R. (2001) *Angew. Chem. Int. Ed.*, 40 (7), 1268

Doneux, C.; Caudano, R.; Delhalle, J.; Leonard-Stibbe, E.; Charlier, J.; Bureau, C.; Tanguy, G.; Lécayon, G. (1997) *Langmuir,* 13, 4898

Edmondson, S.; Osborne, V. L.; Huck, W. T. S. (2004) *Chem. Soc. Rev.*, 33, 14

Fahys, B.; Herlem, G.; Lakard, B.; Reyber, K.; Trokourey, A.; Diaco, T.; Zairi, S.; Jaffrzic-Renault, N. (2002) Electrochimica Acta, 47, 2597

Ferreira, C. A.; Aeiyach, S.; Aaron, J. J.; Lacaze, P. C. (1996) *Electrochim. Acta*, 41, 1801

Ferreira, C. A.; Aeiyach, S.; Delamar, M.; Lacaze, P. C. (1990) *J. Electroanal. Chem.*, 284, 351

Fraoua, K.; Aeiyach, S.; Aubard, J.; Delamar, M.; Lacaze, P. C.; Ferreira, C. A. (1999) *J. Adh. Sci. Tech.*, 13, 517

Herlem, G.; Goux, C.; Fahys, B.; Dominati, F.; Goncalves, A.-M.; Mathieu, C.; Sutter, E.; Trokourey, A.; Penneau, J. F. (1997) J. Electroanal. Chem., 435, 259

Herlem, G.; Lakard, B.; Fahys, B. (2003) Theochem, 638, 177

Herlem, G.; Reybier, K.; Trokourey, A.; Fahys, B. (2000) J. Electrochem. Soc., 147, 597

Hochberg, S. (1979) Industrial Coatings in Kirk-Otmer Encyclopedia of Chemical Technology, J. Wiley, New York, p. 427

Husseman, M.; Meccerreyes, D.; Hawker, C. J.; Hedrick, J. L.; Shah, R.; Abbot, N. L. (1999) *Angew. Chem. Int Ed.*, 38, 647

Jérome, C.; Geskin, V.; Lazzaroni, R.; Bredas, J. L.; Thibault, A.; Calberg, C.; Bodart, I.; Mertens, M.; Martinot, L.; Rodrigue, D.; Riga, J.; Jérôme, R. (2001) *Chem. Mat.*, 13, 1656

Krstajić, B. N.; Grgur, B. N.; Jovanović, S. M.; Vojnović, M. V. (1997) *Electrochim. Acta,* 42, 1685

Lakard, B.; Herlem, G.; Fahys, B. (2002) Theochem, 593, 133

Lécayon, G.; Bouizem, Y.; Le Gressus, C.; Reynaud, C.; Boiziau, C.; Juret, C. (1982) *Chem. Phys. Letters,* 91, 506-510

Lou, X.; Jérôme, C.; Detrembleur, C.; Jérôme, R. (2002) *Langmuir,* 18, 2785

Lu, W. K.; Basak, S.; Elsenbaumer, R. L. (1988) Corrosion Inhibition of Metals by Conductive Polymers in *Handbook of Conductive Polymers*, Chapter 31, Skotherm, T. A.; Elsenbaumer, R. L.; Reynolds, J. R., eds.; Marcel Dekker, New York, p. 881

Lund, H.; Hamerich, O. (2001) Organic Electrochemistry, Chapitre 1C, Marcel Dekker, New York;

McCarley, R. L. (1990) J. Electrochem. Soc., 137, 218C

Mertens, M.; Calberg, C.; Baute, N.; Jérôme, R.; Martinot, L. (1998) *J. Electroanal. Chem.*, 441, 237

Otero, T. F.; Angulo, R. (1992) *J. Appl. Electrochem.*, 22, 369

Plankaert, R. (1994) Surface Coating in Ullmann's Encyclopedia of Industrial Chemistry, Vol A25, 5$^e$ edition, VCH, Weinheim, p. 170

Schirmeisen, M.; Beck, F. (i989) *J. Appl. Electrochem.*, 19, 401

Su, W.; Iroh, J. O. (1997) *Electrochim. Acta,* 42, 2685

Tanguy, J.; Deniau, G.; Auge, C.; Zalczer, G.; Lécayon, G. (1994) *J. Electroanal. Chem.*, 377, 115

Tanguy, J.; Deniau, G.; Zalczer, G.; Lécayon, G. (1996) *J. Electroanal. Chem.*, 417, 175

Tanguy, J.; Viel, P.; Deniau, G.; Lécayon, G. (1993) *Electrochim. Acta*, 38, 175

Troch-Nagels, Winand, R.; Weymeersch, A.; Renard, L. (1992) *J. Appl. Electrochem.*, 22, 756

Vautrin-Ul, C.; Boisse-Laporte, C.; Benissad, N.; Chaussé, A.; Leprince, P.; Messina, R. (2000) Prog. Org. Coating, 38, 9

Viel, P.; Bureau, C.; Deniau, G.; Zalczer, G.; Lécayon, G. (1999) *J. Electroanal. Chem.*, 470, 14

Viel, P.; de Cayeux, S.; Lécayon, G. (1993) *Surf. Interface Anal.*, 20, 468

Voccia, S.; Jérôme, C.; Detrembleur, C.; Leclère, P.; Gouttebaron, R.; Hecq, M.; Gilbert, B.; Lazzaroni, R.; Jerome, R. (2003) *Chem. Mater.*, 15, 923-927

The invention claimed is:

1. A diazonium salt corresponding to one of the following chemical formulae:

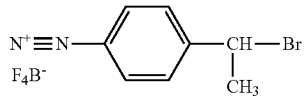

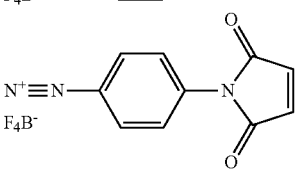

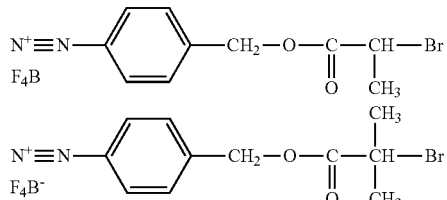

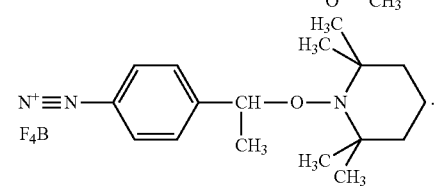

* * * * *